(12) United States Patent
Boyd et al.

(10) Patent No.: US 10,988,073 B1
(45) Date of Patent: Apr. 27, 2021

(54) LIGHTED VEHICLE BEACONING SYSTEMS AND METHODS

(71) Applicant: Lyft, Inc., San Francisco, CA (US)

(72) Inventors: Jeffrey Alan Boyd, San Francisco, CA (US); Jisi Guo, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/729,203

(22) Filed: Dec. 27, 2019

(51) Int. Cl.
| | |
|---|---|
| H05B 39/04 | (2006.01) |
| H05B 39/00 | (2006.01) |
| B60Q 1/00 | (2006.01) |
| F21S 41/125 | (2018.01) |
| H05B 47/19 | (2020.01) |
| H05B 47/105 | (2020.01) |
| F21S 43/20 | (2018.01) |

(52) U.S. Cl.
CPC .......... *B60Q 1/0047* (2013.01); *F21S 41/125* (2018.01); *F21S 43/20* (2018.01); *H05B 47/105* (2020.01); *H05B 47/19* (2020.01)

(58) Field of Classification Search
CPC ..... F21V 23/02; F21V 25/12; H05B 37/0236; A63J 17/00; F21L 14/026; B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60Q 2300/314; B60Q 1/1415; B60Q 2300/42
See application file for complete search history.

(56) References Cited

U.S. PATENT DOCUMENTS

| | | | | |
|---|---|---|---|---|
| 2014/0354419 | A1* | 12/2014 | Frier | ............... B60R 25/10 |
| | | | | 340/432 |
| 2015/0122566 | A1* | 5/2015 | Constien | ............... B62K 5/08 |
| | | | | 180/210 |
| 2016/0297490 | A1* | 10/2016 | Containne | ............... B62J 6/01 |
| 2016/0362154 | A1* | 12/2016 | Poole | ............... B62J 6/01 |
| 2019/0102858 | A1* | 4/2019 | Pivnick | ............... G01C 21/3484 |

\* cited by examiner

*Primary Examiner* — Minh D A

(74) *Attorney, Agent, or Firm* — Haynes and Boone LLP

(57) ABSTRACT

Techniques are disclosed for systems and methods to provide lighted vehicle beaconing, particularly for micro-mobility fleet vehicles. A lighted vehicle beaconing system includes a vehicle light assembly configured to be coupled to and/or integrated with a micro-mobility fleet vehicle and a logic device configured to communicate with the vehicle light assembly. The vehicle light assembly includes a programmable light element configured to receive a lighting control sequence and generate a multicolored and/or animated lighting sequence corresponding to the received lighting control sequence. The logic device is configured to determine the lighting control sequence and to generate the multicolored and/or animated lighting sequence by providing the lighting control sequence to the programmable light element of the vehicle light assembly.

20 Claims, 18 Drawing Sheets

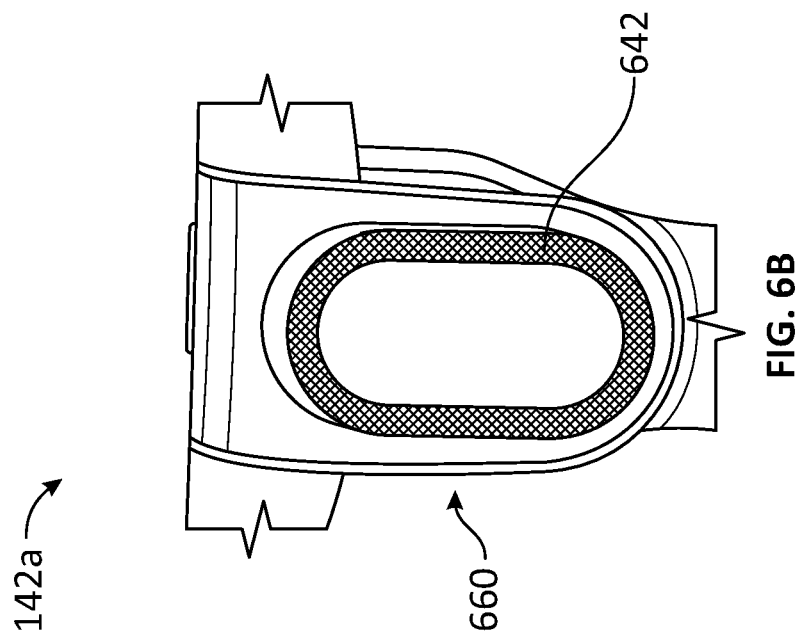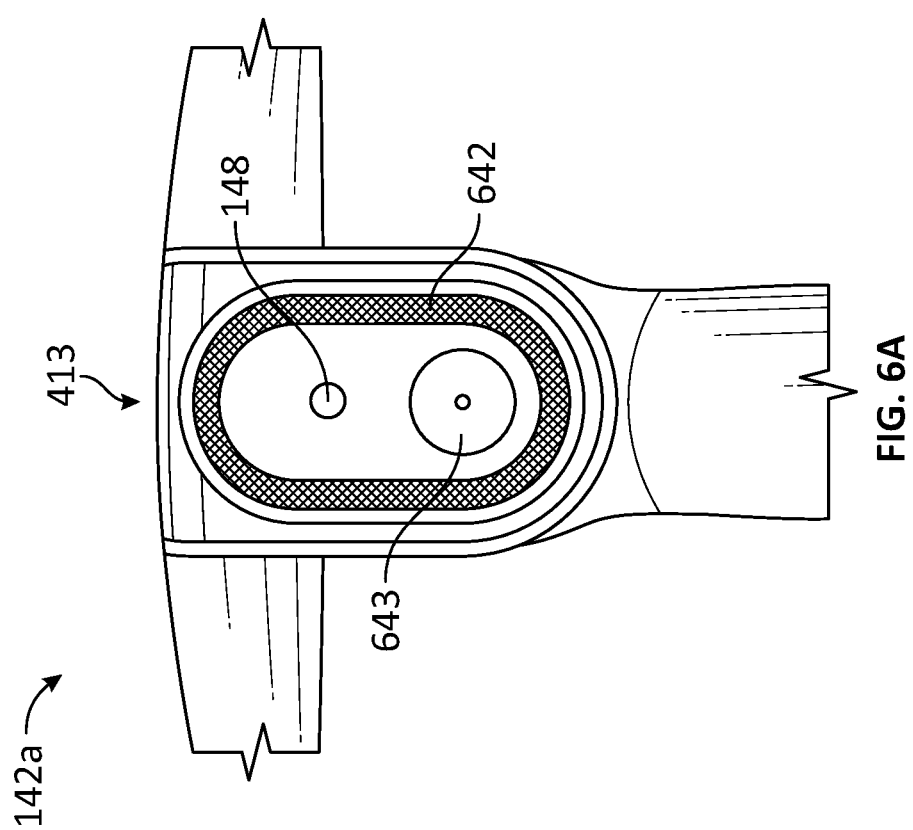

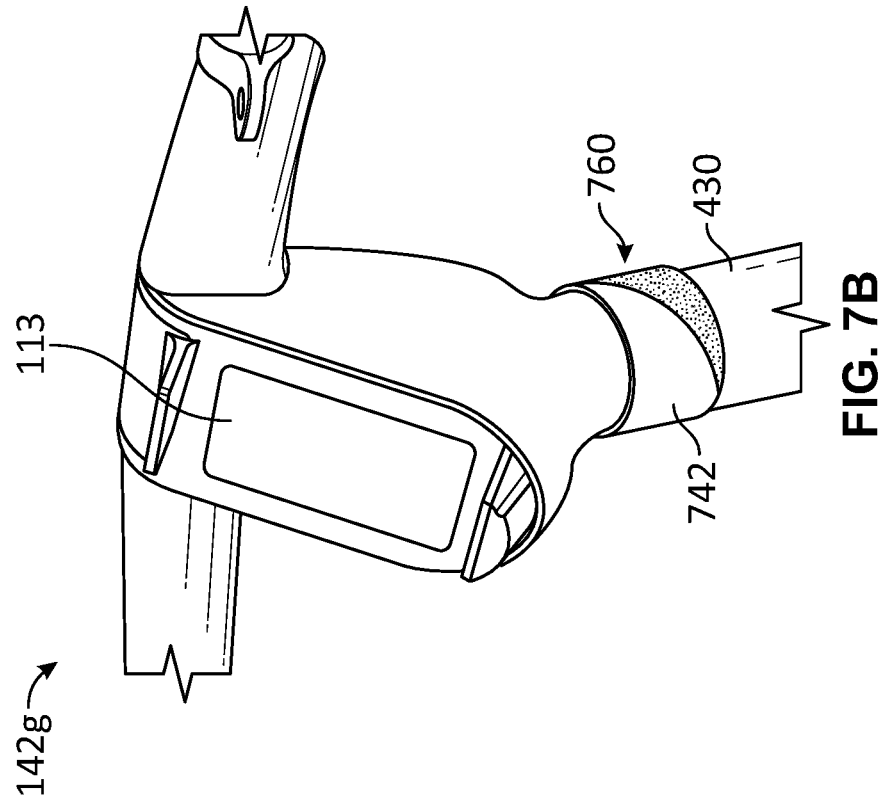
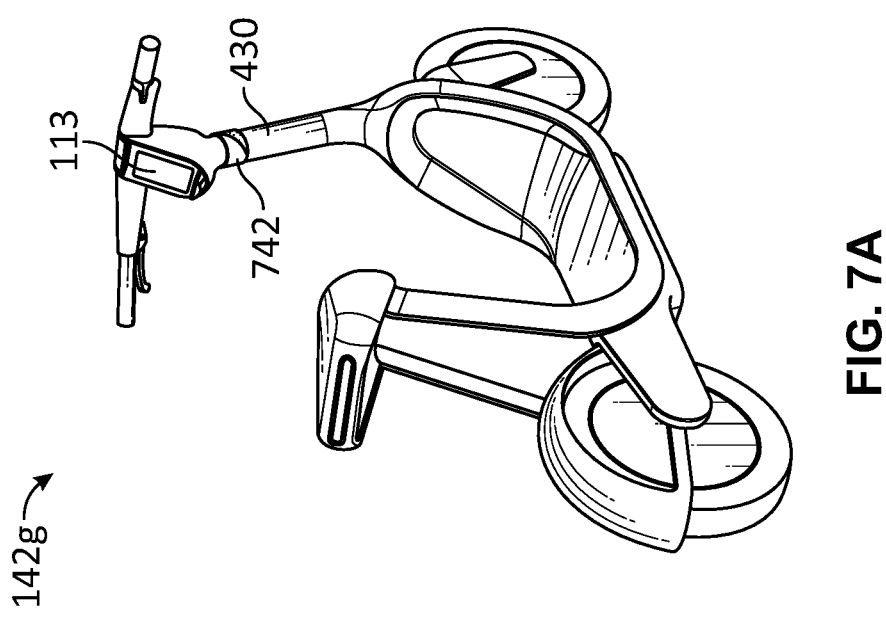

1200 
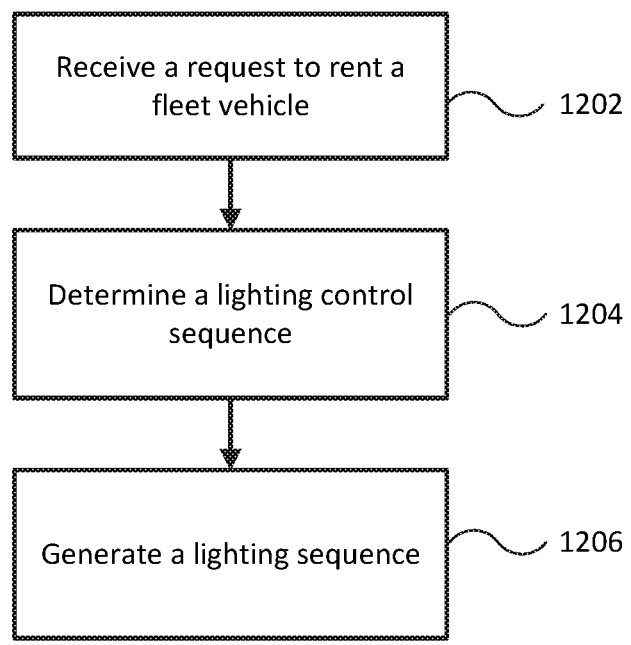
FIG. 12

LIGHTED VEHICLE BEACONING SYSTEMS AND METHODS

TECHNICAL FIELD

One or more embodiments of the present disclosure relate generally to vehicle lighting and more particularly, for example, to systems and methods for providing lighted vehicle beaconing.

BACKGROUND

Contemporary transportation services can incorporate a variety of different types of vehicles, including motorized or electric kick scooters, bicycles, and/or motor scooters designed to transport one or perhaps two people at once (collectively, micro-mobility fleet vehicles). Rider safety and rental convenience are paramount, particularly when such vehicles are incorporated into a dynamic transportation matching system that links requestors or riders to fleet vehicles for hire or temporary rental and personal use. However, as more micro-mobility fleet vehicles are introduced into the transportation services marketplace, it can become difficult to find a particular requested vehicle in a crowd of similarly styled vehicles, and requestor confusion can increase and degrade the overall quality perceived by prospective riders. Moreover, as traffic congestion increases with the general trend of increased rental of micro-mobility fleet vehicles for daily transportation needs, additional safety features are desirable to help reduce any possible congestion-related risk of damage to the rider, bystanders, other vehicles, and the fleet vehicle itself.

Therefore, there is a need in the art for systems and methods to reduce requestor confusion associated with locating a rented micro-mobility fleet vehicle and to increase rider safety generally, particularly in the context of a dynamic transportation matching system providing transportation services incorporating such micro-mobility fleet vehicles.

SUMMARY

Techniques are disclosed for systems and methods to provide lighted vehicle beaconing for micro-mobility fleet vehicles. In accordance with one or more embodiments, a vehicle beaconing system may include a vehicle light assembly configured to be coupled to and/or integrated with a micro-mobility fleet vehicle and a logic device configured to communicate with the vehicle light assembly. The vehicle light assembly may include a programmable light element configured to receive a lighting control sequence and generate a multicolored and/or animated lighting sequence corresponding to the received lighting control sequence. The logic device is configured to determine the lighting control sequence and to generate the multicolored and/or animated lighting sequence by providing the lighting control sequence to the programmable light element of the vehicle light assembly.

In additional embodiments, a method for vehicle beaconing may include determining a lighting control sequence for a vehicle light assembly coupled to and/or integrated with a mobility fleet vehicle, wherein the vehicle light assembly comprises a programmable light element configured to receive a lighting control sequence and generate a multicolored and/or animated lighting sequence corresponding to the received lighting control sequence; and generating the multicolored and/or animated lighting sequence by providing the lighting control sequence to the programmable light element of the vehicle light assembly.

According to some embodiments, a non-transitory machine-readable medium may include a plurality of machine-readable instructions which when executed by one or more processors are adapted to cause the one or more processors to perform a method. In some embodiments, the method may include determining a lighting control sequence for a vehicle light assembly coupled to and/or integrated with a mobility fleet vehicle, wherein the vehicle light assembly comprises a programmable light element configured to receive a lighting control sequence and generate a multicolored and/or animated lighting sequence corresponding to the received lighting control sequence; and generating the multicolored and/or animated lighting sequence by providing the lighting control sequence to the programmable light element of the vehicle light assembly.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 6A-C illustrate various aspects of a micro-mobility fleet vehicle headlight assembly implementing a lighted vehicle beaconing system in accordance with embodiments of the disclosure.

FIGS. 7A-B illustrate various aspects of a micro-mobility fleet vehicle collar light assembly implementing a lighted vehicle beaconing system in accordance with embodiments of the disclosure.

FIG. 12 illustrates a flow diagram of a process to provide lighted vehicle beaconing in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, lighted vehicle beaconing systems provide a relatively reliable and robust methodology to assist requestors in locating a requested and/or rented micro-mobility fleet vehicle. Moreover, such lighted vehicle beaconing systems can be leveraged to increase rider, public, and vehicle safety and to provide positive brand recognition and awareness throughout a transportation service territory. In particular, a lighted vehicle beaconing system may include one or more vehicle light assemblies each including a programmable light element able to generate a broad array of multicolored and/or animated lighting sequences (e.g., including beaconing sequences) that can be used both to identify a particular micro-mobility fleet vehicle in a crowd of micro-mobility fleet vehicles and to provide various additional direct signaling and/or ambient lighting related vehicle safety features, as described herein. Moreover, such programmable light elements may be designed to emulate aspects of a particular brand, for example, to provide instant brand recognition during use without degrading rider or operational safety. In various embodiments, beaconing sequences may be personalized to a requestor, thereby allowing the requestor to select, define, and/or initialize (or disable) a particular beaconing sequence at a particular time, which can help reduce requestor confusion and help increase rider engagement and perceived quality.

Figure 1:
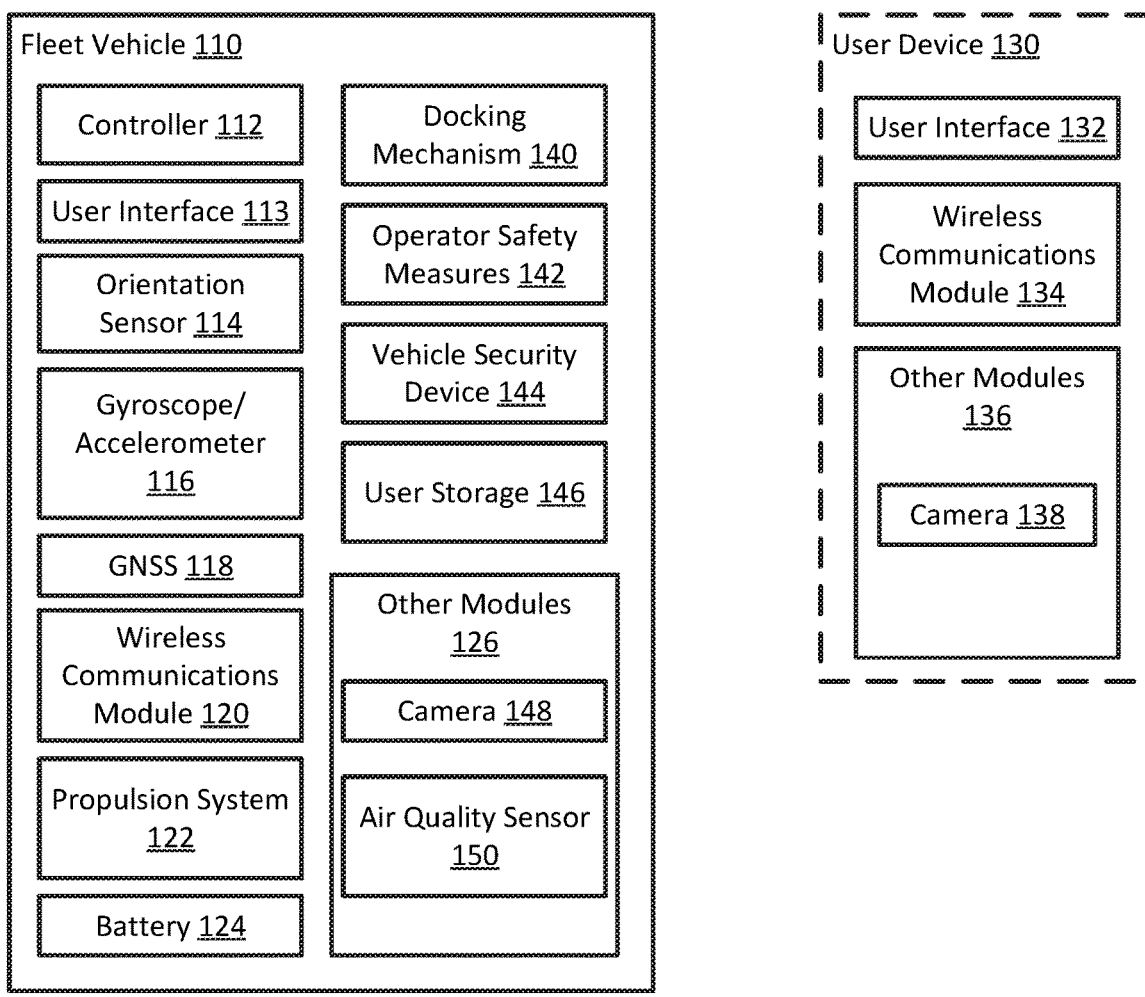
FIG. 1 illustrates a block diagram of a portion of a dynamic transportation matching system including a fleet vehicle in accordance with an embodiment of the disclosure.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, articulated lighting (e.g., articulated lighting coupled to an actuator), and/or other lighting coupled to and/or associated with fleet vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
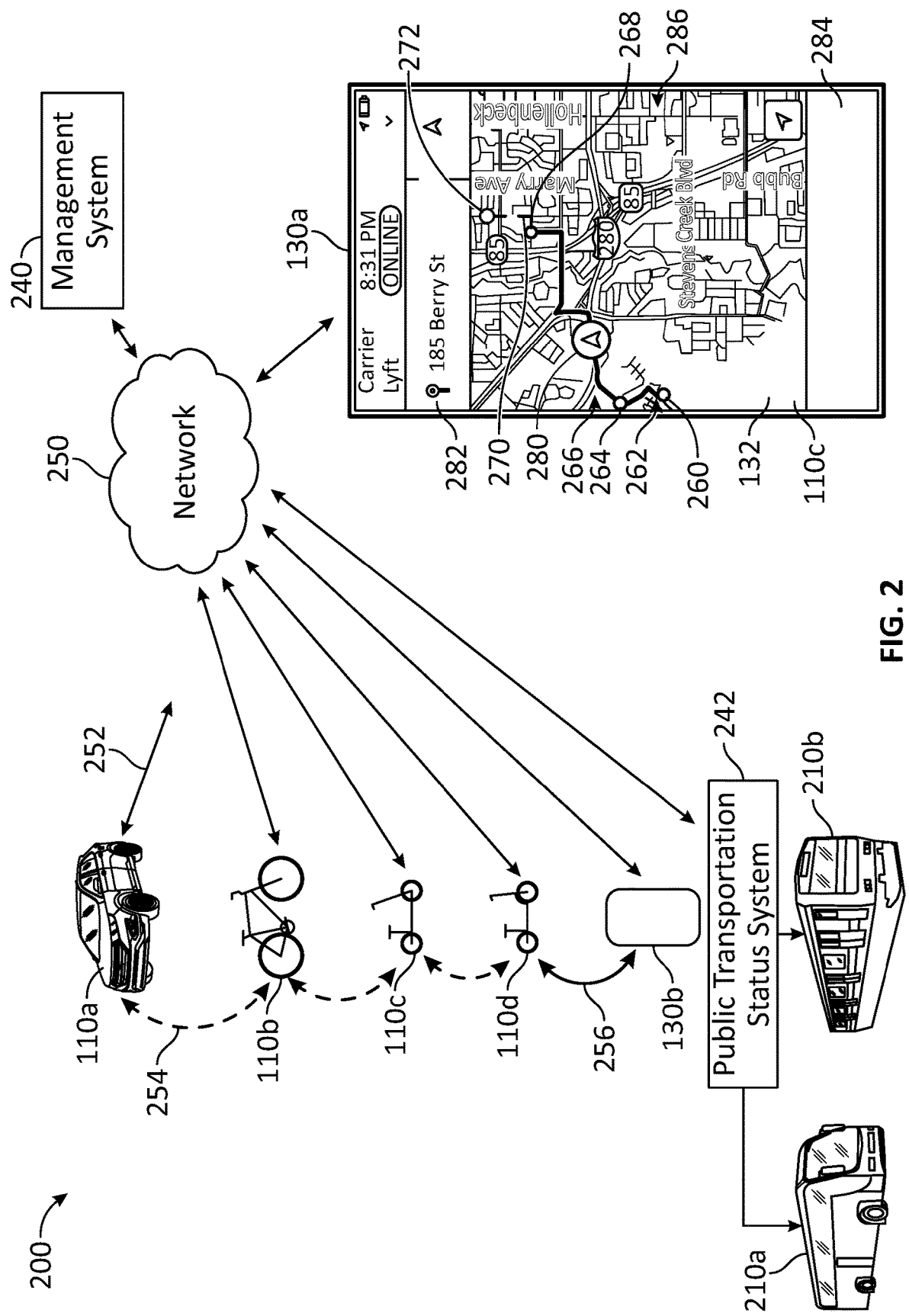
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130a to hire or rent one of fleet vehicles 110a-d by transmitting a transportation request to management system 240 over WAN 250, allowing management system 240 to poll status of fleet vehicles 110a-d and to select one of fleet vehicles 110a-d to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130b, but where the requestor is able to enable a fleet vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110a-d, as described herein.

User device 130a in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110b, 110c, or 110d) from bus stop 268 to destination 272. Also shown rendered by user interface 132 are present location indicator 280 (indicating a present absolute position of user device 130a on street map 286), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
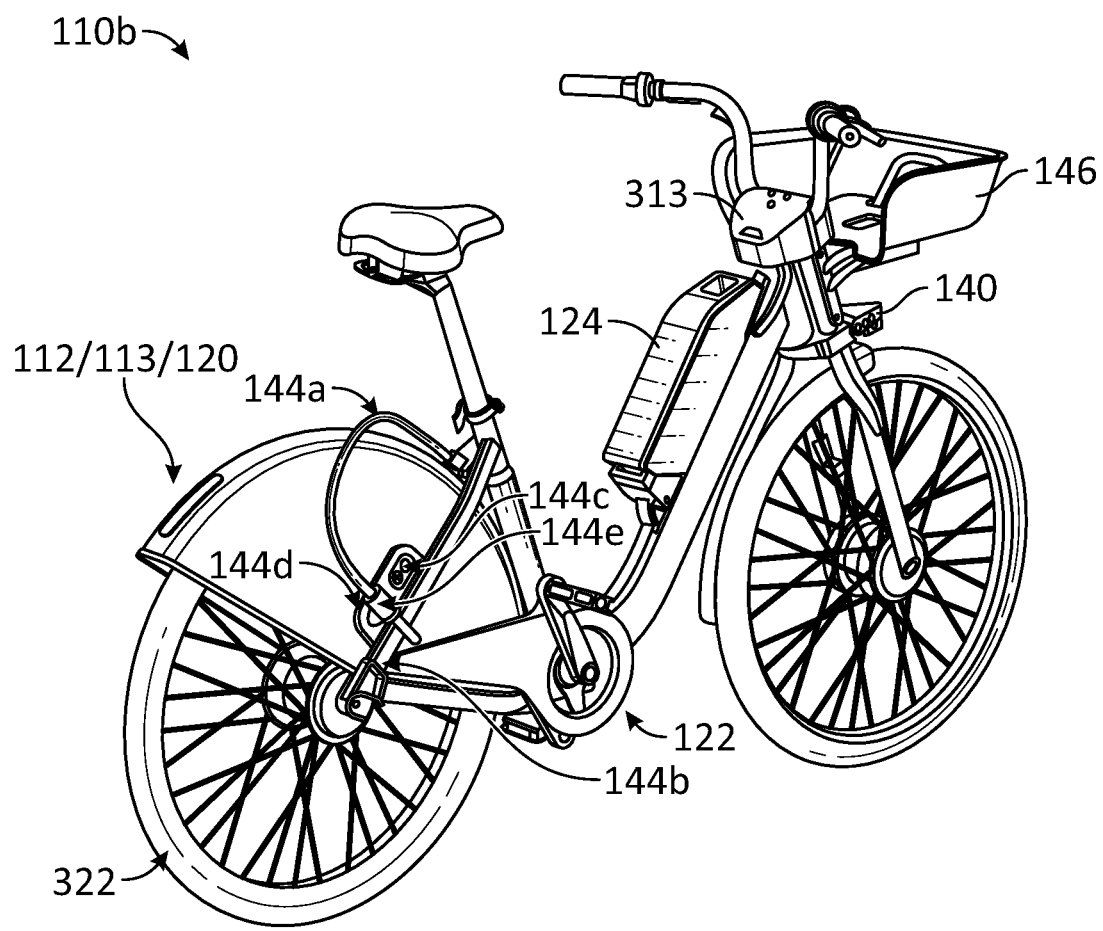
FIGS. 3A-C illustrate diagrams of micro-mobility fleet vehicles for use in a dynamic transportation matching system in accordance with embodiments of the disclosure.
Figure 3B:
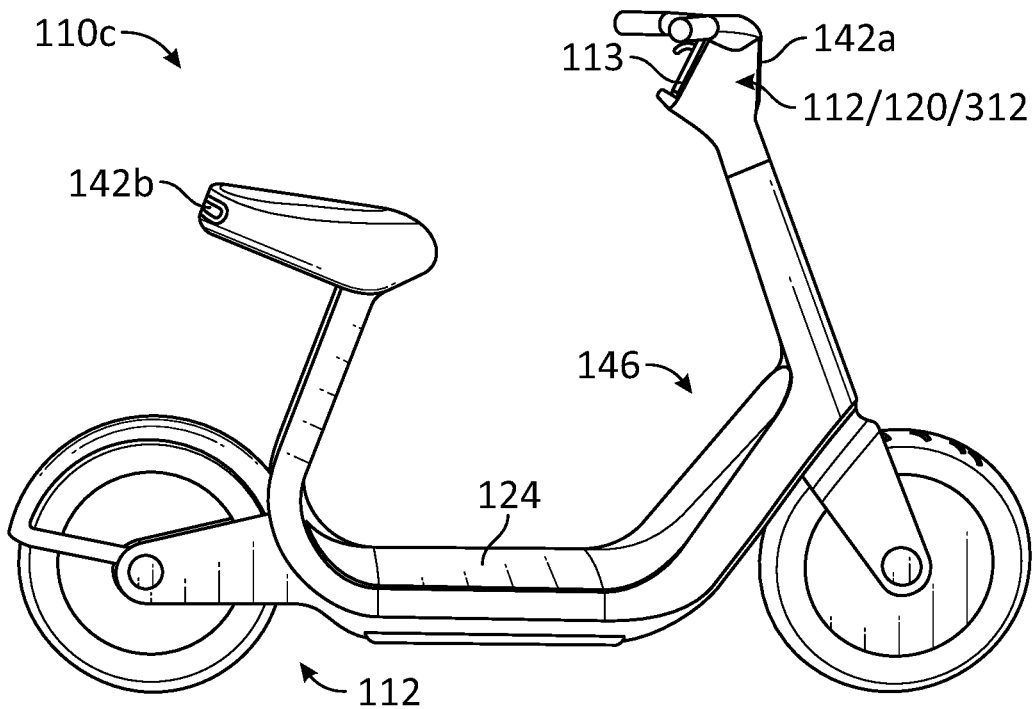
Figure 3C:
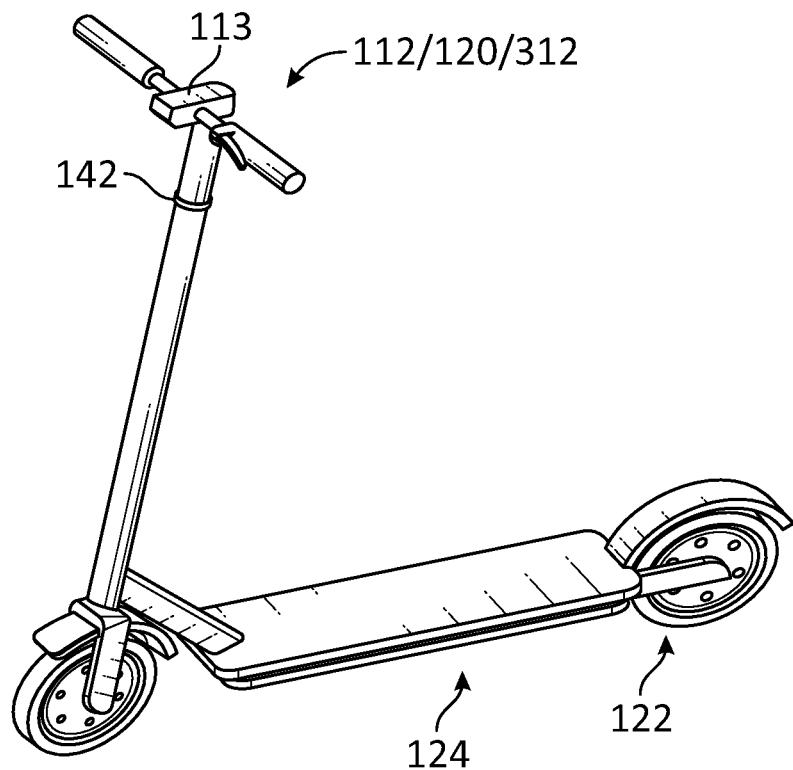

FIGS. 3A-C illustrate diagrams of micro-mobility fleet vehicles 110b, 110c, and 110d, which may be integrated with mobile mesh network provisioning systems in accordance with an embodiment of the disclosure. For example, fleet vehicle 110b of FIG. 3A may correspond to a motorized bicycle for hire that is integrated with the various elements of system 100 and may be configured to participate in dynamic transportation matching system 200 of FIG. 2. As shown, fleet vehicle 110b includes controller/user interface/wireless communications module 112/113/120 (e.g., integrated with a rear fender of fleet vehicle 110b), propulsion system 122 configured to provide motive power to at least one of the wheels (e.g., a rear wheel 322) of fleet vehicle 110b, battery 124 for powering propulsion system 122 and/or other elements of fleet vehicle 110b, docking mechanism 140 (e.g., a spade lock assembly) for docking fleet vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of fleet vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize fleet vehicle 110b by default, thereby requiring a user to transmit a hire request to management system 240 (e.g., via user device 130) to hire fleet vehicle 110b before attempting to use fleet vehicle 110b. The hire request may identify fleet vehicle 110b based on an identifier (e.g., a QR code, a barcode, a serial number, etc.) presented on fleet vehicle 110b (e.g., such as by user interface 113 on a rear fender of fleet vehicle 110b). Once the hire request is approved (e.g., payment is processed), management system 240 may transmit an unlock signal to fleet vehicle 110b (e.g., via network 250). Upon receiving the unlock signal, fleet vehicle 110b (e.g., controller 112 of fleet vehicle 110b) may release vehicle security device 144 and unlock rear wheel 322 of fleet vehicle 110b.

Fleet vehicle 110c of FIG. 3B may correspond to a motorized sit-scooter for hire that is integrated with the various elements of system 100 and may be configured to participate in dynamic transportation matching system 200 of FIG. 2. As shown in FIG. 3B, fleet vehicle 110c includes many of the same elements as those discussed with respect to fleet vehicle 110b of FIG. 3A. For example, fleet vehicle 110c may include user interface 113, propulsion system 122, battery 124, controller/wireless communications module/ cockpit enclosure 112/120/312, user storage 146 (e.g., implemented as a storage recess), and operator safety measures 142a and 142b, which may be implemented as various types of headlight assemblies, taillight assemblies, programmable light elements/strips/spotlights, and/or reflective strips, as described herein. As shown in FIG. 3B, fleet vehicle 110c may also be implemented with various other vehicle light assemblies to increase visibility, to provide ambient lighting, and/or to provide lighted beaconing, as described herein.

Fleet vehicle 110d of FIG. 3C may correspond to a motorized stand or kick scooter for hire that is integrated with the various elements of system 100 and may be configured to participate in dynamic transportation matching system 200 of FIG. 2. As shown in FIG. 3C, fleet vehicle 110d includes many of the same elements as those discussed with respect to fleet vehicle 110b of FIG. 3A. For example, fleet vehicle 110d may include user interface 113, propulsion system 122, battery 124, controller/wireless communications module/cockpit enclosure 112/120/312, and operator safety measures 142, which may be implemented as various types of programmable light strips and/or reflective strips, as shown.

Figure 4A:
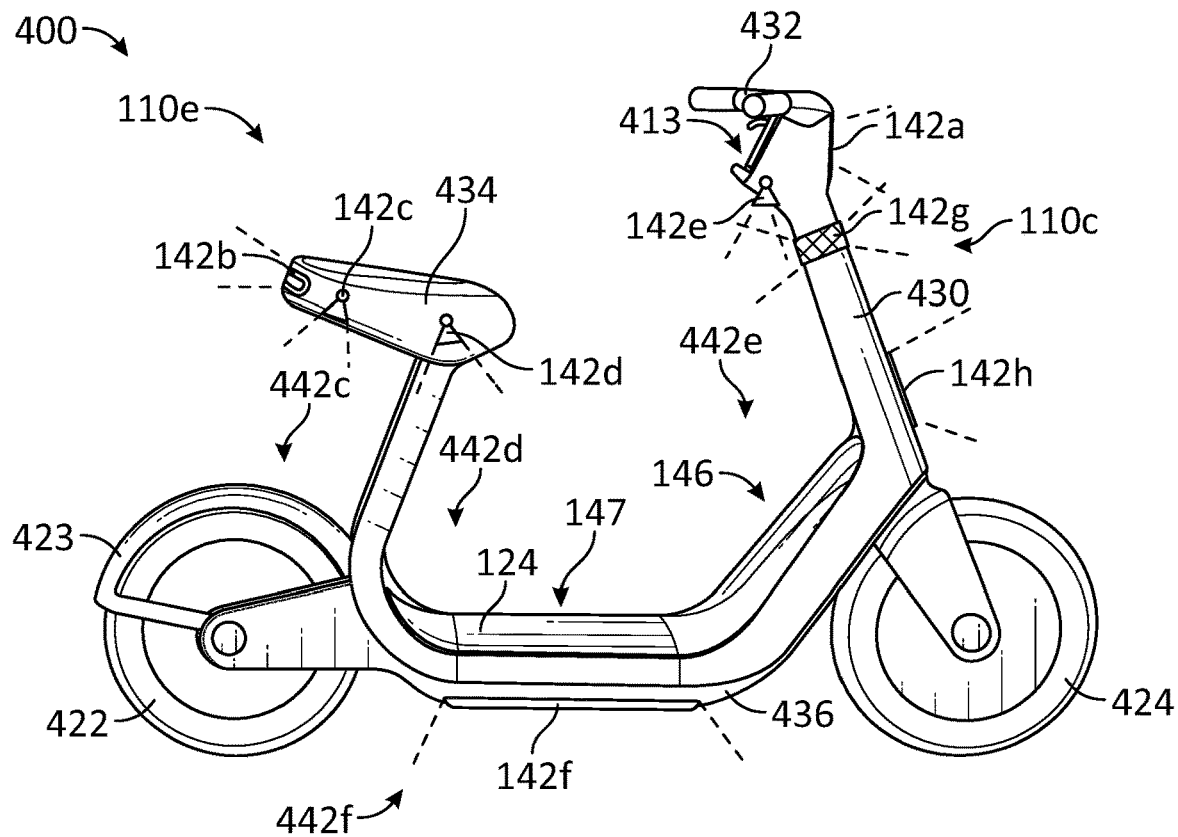
FIGS. 4A-B illustrate diagrams of a micro-mobility fleet vehicle lighting system including one or more lighted vehicle beaconing systems in accordance with embodiments of the disclosure.
Figure 4B:
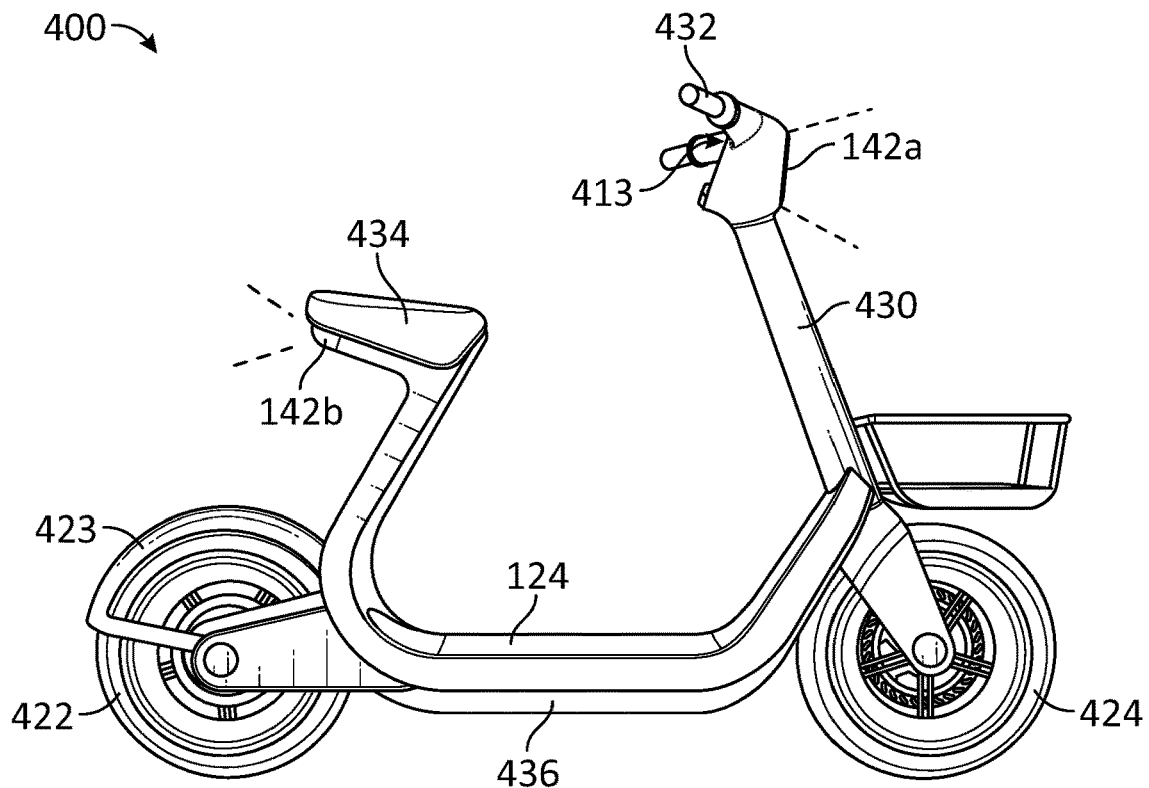

As described herein, each of micro-mobility fleet vehicles 110b-d may be implemented with a lighted vehicle beaconing system configured to assist requestors in locating a requested and/or rented micro-mobility fleet vehicle and to increase overall safety associated with operation of micro-mobility fleet vehicles 110b-d. For example, FIGS. 4A-B illustrates diagrams of a micro-mobility fleet vehicle lighting system 400 including one or more lighted vehicle beaconing systems in accordance with embodiments of the disclosure. In particular, FIG. 4A shows a micro-mobility fleet vehicle lighting system 400 (e.g., an embodiment of operator safety measures 142) including a variety of vehicle light assemblies 142a-h integrated with and/or coupled to sit-scooter 110c. In the specific embodiment shown in FIG. 4A, vehicle lighting system 400 includes headlight assembly 142a disposed at a top of steering column/head tube 430, taillight assembly 142b integrated with seat 434, various ambient light assemblies 142c-f (e.g., indirect running-light assembly 142c and foot-space light assembly 142d integrated with seat 434, storage light assembly 142e disposed at the top of steering column/head tube 430, ground light assembly 142f integrated with floorboard 436), collar beacon light assembly 142g disposed adjacent to the top of and/or integrated with steering column/head tube 430, and headlight assembly 142h disposed along steering column/head tube 430 adjacent to a base of steering column/head tube 430. More generally, vehicle lighting system 400 may include additional vehicle light assemblies, for example, and/or any one or sub-combination of vehicle light assemblies 142a-h, such as including only headlight assembly 142a and/or taillight assembly 142b.

In various embodiments, vehicle lighting system 400 may be configured to facilitate general safe operation of fleet vehicle 110c. For example, vehicle lighting system 400 may: assist a fleet servicer or vehicle operator/rider to inspect elements (e.g., front tire 424, rear tire 422) of fleet vehicle 110c for damage and/or to service fleet vehicle 110c prior to operation, even in relatively poor lighting conditions; provide sufficient running illumination to provide situational awareness to other vehicle operators on the road; to identify a particular fleet vehicle 110c as ready to operate and/or as a requestor's hired vehicle; and to convey critical safety statuses to a fleet servicer, vehicle operator, or bystander (e.g., impending depleted charge, exceeding speed advisories/regulations, such as along public thoroughfares or as entering corners of a planned route, detected vehicle damage—deflated tires, unexpected vehicle abandonment, vehicle theft).

In general, each one of vehicle light assemblies 142a-h may include and/or be implemented by a programmable light element. Each programmable light element may include a multicolored light strip or cluster of light elements (e.g., array of addressable LEDs) and/or a logic device (e.g., an embodiment of controller 112) that may be configured to communicate with controller 112 and generate programmable multicolored and/or animated lighting, as described herein. For example, each programmable light element of vehicle light assemblies 142a-h may be configured to receive a beaconing control sequence and/or other lighting control sequence (e.g., from controller 112) and to generate a corresponding multicolored and/or animated lighting sequence (e.g., a lighted beaconing sequence), as described herein. Each programmable light element may be implemented with a light guide and/or reflective housing (e.g., with a clear textured plastic shell) to facilitate reproduction of a particular multicolored and/or animated lighting sequence along a surface of the programmable light element, for example, or along a surface illuminated by the programmable light element, as described herein. Lighting control sequences, as used herein, may include control signals to control the color, intensity, timing, and/or other lighting characteristic of one or more programmable light elements, including LEDs, as described herein.

In FIG. 4A, headlight assembly 142a may be configured to provide forward facing illumination for fleet vehicle 110c, such as to illuminate a front and/or an expected forward path of fleet vehicle 110c to aid in the typical operation of fleet vehicle 110c (e.g., safe placement of front wheel 424), for example, and/or to provide forward facing lighted beaconing with respect to fleet vehicle 110c. As shown in FIG. 4A, headlight assembly 142a may be disposed at a top of steering column/head tube 430, and in some embodiments may be integrated with cockpit assembly 413 (e.g., an embodiment of controller/wireless communications module/cockpit enclosure 112/120/312) and/or handlebars 432. Taillight assembly 142b may be configured to provide rear facing illumination for fleet vehicle 110c, such as to illuminate a rear and/or a reverse path of fleet vehicle 110c to provide road visibility for fleet vehicle 110c, for example, and/or to provide rear facing lighted beaconing with respect to fleet vehicle 110c. Collar beacon light assembly 142g may be configured to provide substantially omnidirectional lighted beaconing with respect to fleet vehicle 110c. Headlight assembly 142h, similar to headlight assembly 142a, may be configured to provide forward facing illumination for fleet vehicle 110c and/or forward facing lighted beaconing with respect to fleet vehicle 110c.

In some embodiments, ambient light assemblies 142c-f may each be implemented by programmable light elements configured to generate programmable multicolored and/or animated lighting (e.g., animated in terms of color and/or intensity), such as spotlights implemented as programmable/addressable LED clusters providing multicolored and variable intensity spot lighting, for example. In other embodiments, ambient light assemblies 142c-f may each be implemented by programmable light elements configured to generate programmable animated monochrome lighting (e.g., animated in time and in terms of intensity). Indirect running-light assembly 142c may be implemented as a recessed or concealed spotlight (e.g., within seat 434) configured to provide rear vehicle illumination 442c (e.g., of rear wheel 422 and/or rear fender/mud guard 423) to provide road visibility for fleet vehicle 110c, for example, and/or to provide rear ambient lighted beaconing with respect to fleet vehicle 110c. Foot-space light assembly 142d may be implemented as a recessed or concealed spotlight (e.g., within seat 434) configured to provide foot-space illumination 442d (e.g., of battery 124 and/or foot-space 147) to assist a fleet servicer in replacing battery 123 or to assist a vehicle operator in foot placement within foot-space 147 or on ground adjacent floorboard 436, for example, and/or to provide central ambient lighted beaconing with respect to fleet vehicle 110c. Storage light assembly 142e may be implemented as a recessed or concealed spotlight (e.g., within cockpit assembly 413) configured to provide storage illumination 442e (e.g., of user storage/storage recess 146) to assist a vehicle operator in package or backpack placement within user storage/storage recess 146 or in foot placement on ground adjacent floorboard 436, for example, and/or to provide central ambient lighted beaconing with respect to fleet vehicle 110c.

Ground light assembly 142f may be implemented as a recessed or concealed light panel or spotlight (e.g., within floorboard 436) configured to provide ground illumination 442f (e.g., under floorboard 436) to assist a vehicle operator in foot or vehicle placement on ground adjacent floorboard 436, for example, and/or to provide walkup or ground-reflected ambient lighted beaconing with respect to fleet vehicle 110c. In some embodiments, ground light assembly 142f may include a light stencil or other illumination shaping mechanism to generate a shape, logo, or text within or by ground illumination 442f, as described herein.

In similar fashion, FIG. 4B shows an embodiment of micro-mobility fleet vehicle lighting system 400 (e.g., an embodiment of operator safety measures 142) including vehicle light assemblies 142a-b integrated with and/or coupled to sit-scooter 110c. In the specific embodiment shown in FIG. 4B, vehicle lighting system 400 includes headlight assembly 142a disposed at a top of steering column/head tube 430 and taillight assembly 142b disposed beneath and integrated with a frame support for seat 434. Taillight assembly 142b of FIG. 4B may be configured to provide rear facing illumination for fleet vehicle 110c, such as to illuminate a rear and/or a reverse path of fleet vehicle 110c to provide road visibility for fleet vehicle 110c, for example, and/or to provide rear facing lighted beaconing with respect to fleet vehicle 110c. In various embodiments, taillight assembly 142b of FIG. 4A may be implemented as a stadium or obround shaped strip light array formed as a loop with a pill shaped unlighted interior, for example, and taillight assembly 142b of FIG. 4B may be implemented as a strip light array formed as a solid bar (e.g., without an unlighted interior), which may or may not be obround shaped.

Figure 5A:
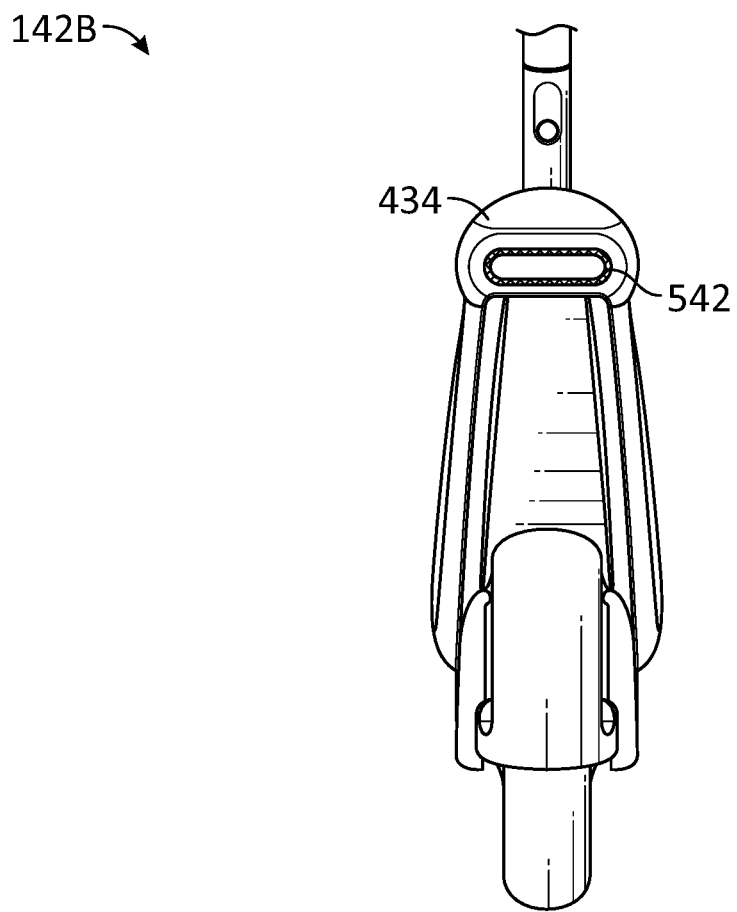
FIGS. 5A-B illustrate various aspects of a micro-mobility fleet vehicle taillight assembly implementing a lighted vehicle beaconing system in accordance with embodiments of the disclosure.
Figure 5B:
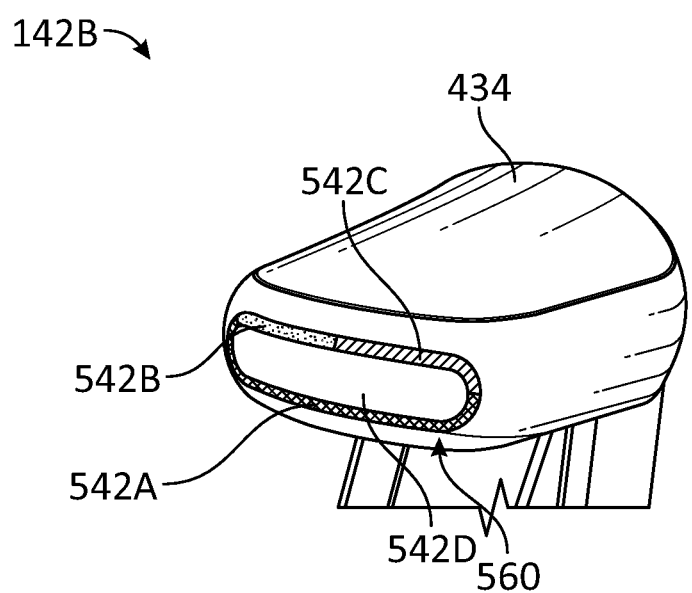

FIGS. 5A-B illustrate various aspects of micro-mobility fleet vehicle taillight assembly 142b implementing a lighted vehicle beaconing system (e.g., a portion of vehicle lighting system 400) in accordance with embodiments of the disclosure. For example, FIG. 5A shows a rear view of taillight assembly 142b including programmable light element 542 integrated with seat 434. In FIG. 5A, programmable light element 542 is implemented as a horizontally aligned stadium or obround shaped programmable strip light array (e.g., where a long axis of the obround shaped is substantially horizontal with respect to the typical operating orientation of fleet vehicle 110 relative to a flat ground surface) configured to receive a lighting control sequence (e.g., from controller 112) and generate a corresponding multicolored and/or animated lighting sequence, as described herein. For example, FIG. 5B shows an oblique view of taillight assembly 142b generating such multicolored and/or animated lighting sequence 560. In FIG. 5B, a lower half 542a of the obround strip light array is configured to illuminate according to an operational status of fleet vehicle 110c and/or a braking level or status of fleet vehicle 110c (e.g., on, off, or gradations of braking level), an upper left half 542b of the obround strip light array, relative to a typical rider perspective, is configured to illuminate according to left turn signal status of fleet vehicle 110c (e.g., selected by a rider or inferred from a planned route), and an upper right half 542c of the obround strip light array is configured to illuminate according to right turn signal status of fleet vehicle 110c. In various embodiments, programmable light element 542 may be implemented as a loop and include a pill shaped unlighted interior 542d, as shown in FIG. 5B.

In the embodiment shown in FIG. 5B, lighting sequence 560 includes lower half 542a that is unanimated and energized according to a single color to show fleet vehicle 110c is hired and operating to convey a rider to a destination, upper left half 542b is unanimated and energized according to a single color to show fleet vehicle 110c is operating and not turning left, and upper right half 542c is animated to blink on and off (e.g., according to a single color) to indicate fleet vehicle 110c will be turning right. In alternative embodiments, lower half 542a and upper half 542b may be left unenergized, for example, and/or upper right half 542c may be animated to energize light elements of upper right half 542c from a center of programmable light element 542 to a right edge of upper right half 542c (e.g., a sweep right animation).

Figure 6C:
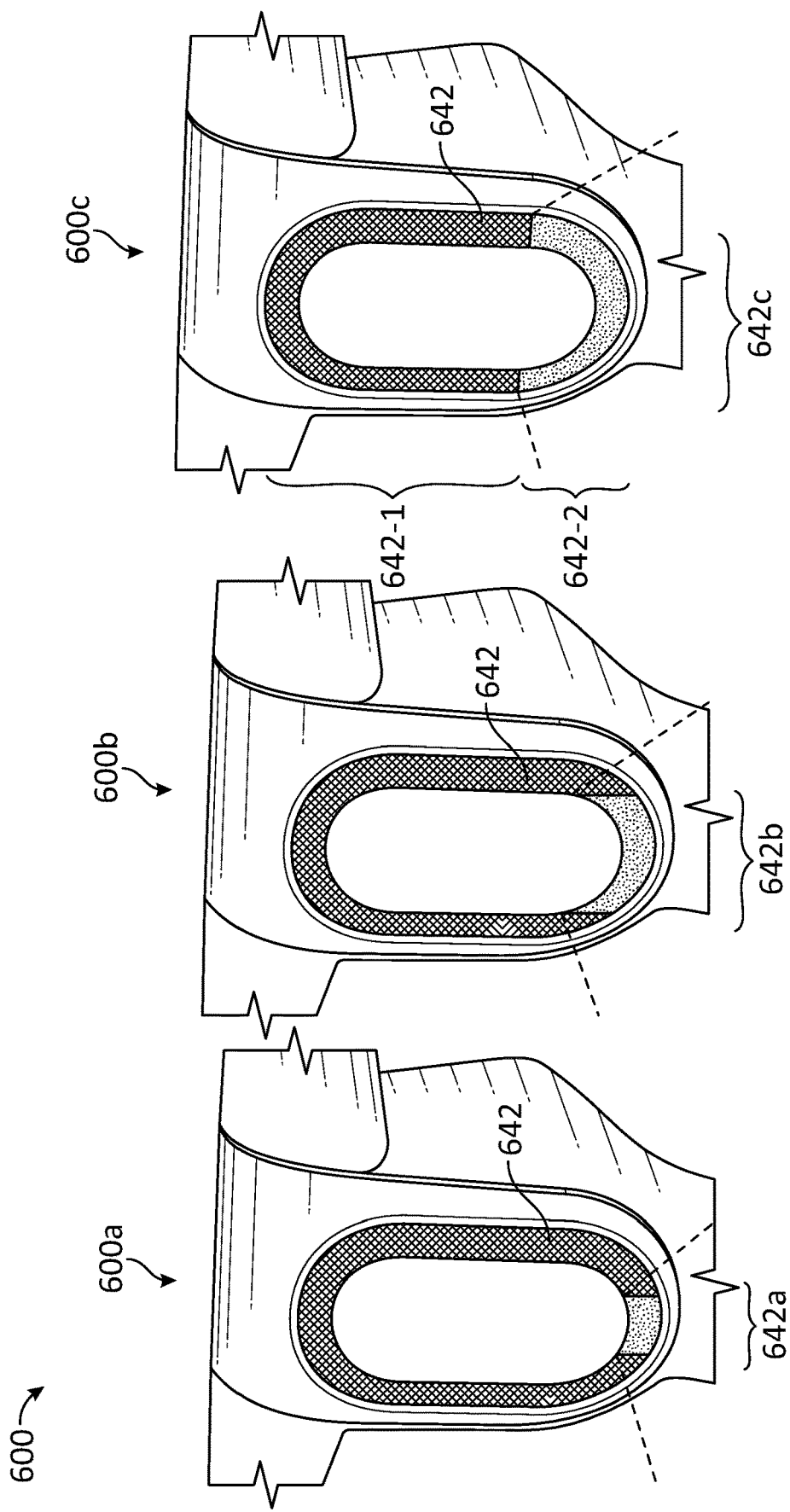

FIGS. 6A-C illustrate various aspects of micro-mobility fleet vehicle headlight assembly 142a implementing a lighted vehicle beaconing system (e.g., a portion of vehicle lighting system 400) in accordance with embodiments of the disclosure. For example, FIG. 6A shows a front view of headlight assembly 142a including programmable light element 642, headlamp element 643, and camera/ambient light sensor 148 integrated with cockpit assembly 413. In the embodiment illustrated by FIG. 6A, headlamp element 643 and camera/ambient light sensor 148 are disposed within an inner perimeter of programmable light element 642. In alternative embodiments, headlight assembly 142a may omit one or more of headlamp element 643 and camera/ambient light sensor 148, as shown in FIG. 6B. In further embodiments, headlamp element 643 may be positioned above camera/ambient light sensor 148, such that their relative positions are substantially switched relative to the embodiment shown in FIG. 6A.

Camera/ambient light sensor 148 may be implemented similarly with respect to camera 148 of FIG. 1, for example, and may be used to detect an ambient light level about fleet vehicle 110c. Headlamp element 643 may be implemented by a relatively high lumen output LED or LED cluster at least partially recessed within headlight assembly 142a and configured to provide a substantially monochrome/white beam of light (e.g., with approximately or at least a 90-degree horizontal beam angle) illuminating an expected path of fleet vehicle 110c. If present, headlamp element 643 may be configured to provide the primary forward operational illumination for fleet vehicle 110c, for example, or may be configured to supplement a forward operational illumination generated by programmable light element 642. In various embodiments, headlamp element 643 may be configured to receive a lighting control signal or sequence (e.g., from controller 112) and generate a lighting sequence and/or turn itself on or off based on the received lighting control signal or sequence (e.g., to turn on during night operation, or to strobe upon theft detection or as part of a beaconing sequence). In some embodiments, headlamp element 643 may be configured to receive a lighting control signal in the form of an ambient lighting level status from camera/ambient light sensor 148, for example, and to turn itself on or off based on the received ambient lighting level status indicating ambient light about fleet vehicle 110c is below or above a preset minimum operational ambient lighting level associated with fleet vehicle 110c.

In FIG. 6A, programmable light element 642 is implemented as a vertically aligned stadium or obround shaped programmable strip light array (e.g., where a long axis of the obround shaped is substantially vertical with respect to the typical operating orientation of fleet vehicle 110 relative to a flat ground surface) configured to receive a lighting control sequence (e.g., from controller 112) and generate a corresponding multicolored and/or animated lighting sequence, as described herein. For example, FIG. 6B shows an oblique view of headlight assembly 142a generating such multicolored and/or animated lighting sequence 660. In FIG. 6B, lighting sequence 660 includes vertical strips of light elements of the obround strip light array (e.g., programmable light element 642) being energized from the left side to the right side (e.g., from the perspective of the figure) of programmable light element 642 until the full obround strip light array is energized, and then de-energizing those elements from the left side to the right side until the full obround strip light array is de-energized, and then reversing the process from left to right (e.g., a pendulum animation, or a combination sweep right and sweep left animation). In some embodiments, such multicolored and/or animated lighting sequence 660 may be only partially implemented, so as to indicate a left or right turn status of fleet vehicle 110c to other vehicles/pedestrians in front of fleet vehicle 110c.

FIG. 6C shows a series of oblique views of headlight assembly 142a generating an embodiment of lighting sequence 660 configured to provide variable forward illumination of a path of fleet vehicle 11c. For example, lighting sequence element 600a shows portion 642a of programmable light element 642 energized to provide a minimal level of headlight illumination (e.g., such as at dusk, when ambient light is still largely sufficient for operating fleet vehicle 110c but a forward running light is desirable to indicate presence to other vehicles/pedestrians), lighting sequence element 600b shows portion 642b of programmable light element 642 energized to provide an operational level of headlight illumination (e.g., such as during typical urban operation of fleet vehicle 110c at night), and lighting sequence element 600c shows portion 642c of programmable light element 642 energized to provide an extended level of headlight illumination (e.g., similar to a high beam in a conventional vehicle, useful in relatively rural operation of fleet vehicle 110c at night). In some embodiments, light elements of portion 642-1 of programmable light element 642 may be differentiated from light elements of portion 642-2 of programmable light element 642, such that light elements of portion 642-2 may be implemented by an array of relatively high lumen output monochrome/white LEDs, and light elements of portion 642-1 may be implemented by a multicolor array of relatively intermediate or low lumen output LEDs.

FIGS. 7A-B illustrate various aspects of micro-mobility fleet vehicle collar beacon light assembly 142g implementing a lighted vehicle beaconing system (e.g., a portion of vehicle lighting system 400) in accordance with embodiments of the disclosure. For example, FIG. 7A shows a rear oblique view of collar beacon light assembly 142g including programmable light element 742 coupled to and/or integrated with steering column/head tube 430. In FIG. 7A, programmable light element 742 is implemented as a programmable strip light array wrapped about an upper end of steering column/head tube 430 and configured to receive a lighting control sequence (e.g., from controller 112) and generate a corresponding multicolored and/or animated lighting sequence, as described herein, which may or may not also be reproduced by user interface 113 (e.g., integrated with cockpit assembly 413 of FIGS. 4A-B). For example, FIG. 7B shows a close view of collar beacon light assembly 142g generating such multicolored and/or animated lighting sequence 760. In FIG. 7B, strip light array/programmable light element 742 is configured to illuminate according to a beaconing or lighting control sequence that is at least temporally specific to fleet vehicle 110c to help guide a requestor to fleet vehicle 110c (e.g., and away from other fleet vehicles local to fleet vehicle 110c) after fleet vehicle 110c has been successfully hired for use, as described herein. In some embodiments, user interface 113 may participate in such beaconing by reproducing multicolor and/or animated elements of the lighting sequence, as described herein.

Figure 8:
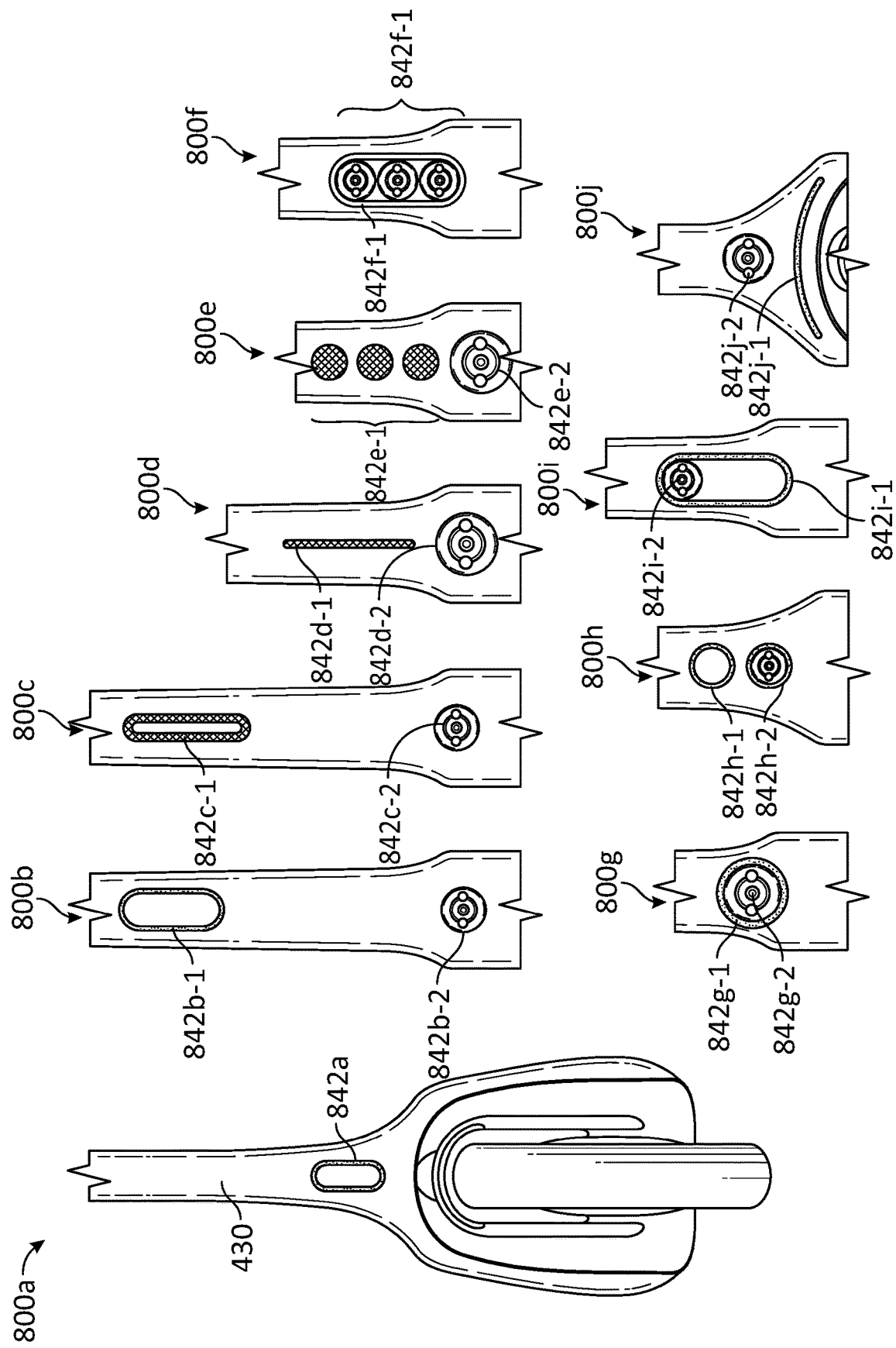
FIG. 8 illustrates various micro-mobility fleet vehicle headlight assemblies implementing lighted vehicle beaconing systems in accordance with embodiments of the disclosure.

FIG. 8 illustrates various micro-mobility fleet vehicle headlight assemblies 800a-j implementing lighted vehicle beaconing systems 800 (e.g., portions of vehicle lighting system 400 analogous to headlight assembly 142h in FIG. 4A) in accordance with embodiments of the disclosure. For example, each of headlight assemblies 800a-j include programmable light elements and/or headlamp elements disposed along and/or integrated with a front portion of steering column/head tube 430 and configured to receive a lighting control sequence (e.g., from controller 112) and generate a corresponding multicolored and/or animated lighting sequence, as described herein. In particular, headlight assembly 800a includes programmable light element 842a implemented as a vertically aligned stadium or obround shaped programmable strip light array disposed proximate to a base of steering column/head tube 430. Headlight assembly 800b includes programmable light element 842b-1 implemented as a vertically aligned obround shaped programmable strip light array disposed proximate to a top of steering column/head tube 430 and a headlamp element 842b-2 disposed proximate to a base of steering column/head tube 430. Headlight assembly 800c includes programmable light element 842c-1 implemented as a vertically aligned and relatively thin obround shaped programmable strip light array disposed proximate to a top of steering column/head tube 430 and a headlamp element 842c-2 disposed proximate to a base of steering column/head tube 430. Headlight assembly 800d includes programmable light element 842d-1 implemented as a vertically aligned programmable strip light array disposed above and proximate to a headlamp element 842d-2 that is itself disposed proximate to a base of steering column/head tube 430. Headlight assembly 800e includes programmable light element 842e-1 implemented as a vertically aligned programmable array of light disks disposed above and proximate to a headlamp element 842e-2 that is itself disposed proximate to a base of steering column/head tube 430. Headlight assembly 800f includes programmable light element 842f-1 implemented as a vertically aligned obround shaped programmable strip light array disposed proximate to a base of steering column/head tube 430 and about a headlamp element array 842f-2.

Headlight assembly 800g includes programmable light element 842g-1 implemented as a circular shaped programmable strip light array disposed proximate to a base of steering column/head tube 430 and about a headlamp element 842g-2. Headlight assembly 800h includes programmable light element 842h-1 implemented as a circular shaped programmable strip light array disposed proximate to an embodiment of headlight assembly 800g (e.g., headlamp assembly 842h-2) that is itself disposed proximate to a base of steering column/head tube 430. Headlight assembly 800i includes programmable light element 842i-1 implemented as a vertically aligned obround shaped programmable strip light array disposed proximate to a base of steering column/head tube 430 and a headlamp element 842i-2 disposed within an inner perimeter of programmable light element 842i-1. Headlight assembly 800j includes programmable light element 842j-1 implemented as a downward facing arcuate shaped programmable strip light array disposed proximate to a base of steering column/head tube 430 and a headlamp element 842j-2 disposed above and proximate to programmable light element 842j-1.

Figure 9A:
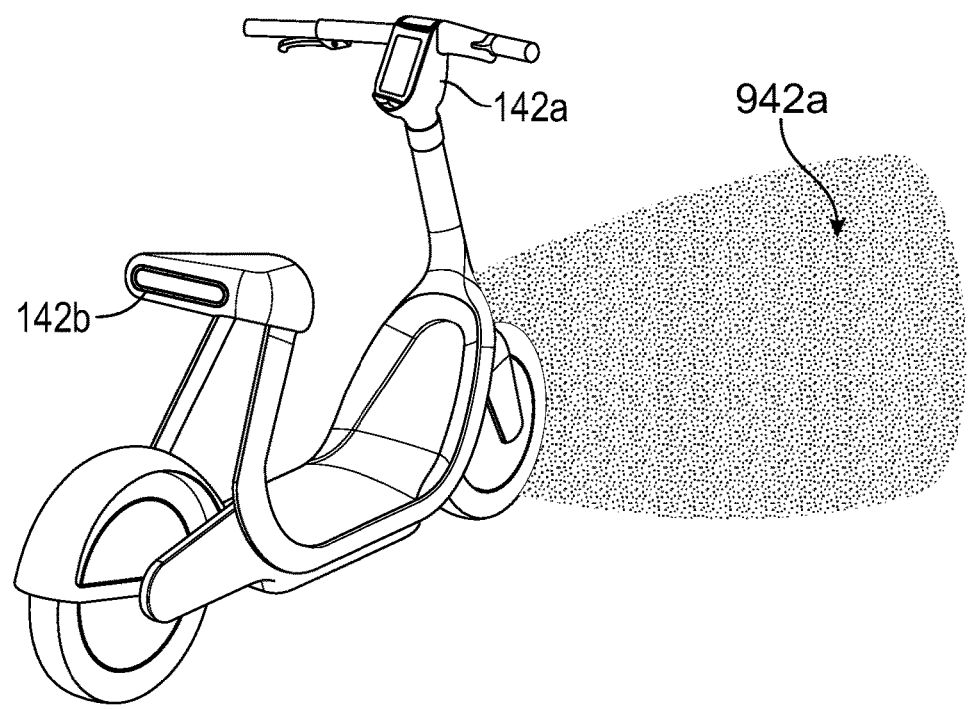
FIGS. 9A-D illustrate various aspects of a micro-mobility fleet vehicle lighting system including one or more lighted vehicle beaconing systems and a variety of ambient light assemblies in accordance with embodiments of the disclosure.
Figure 9B:
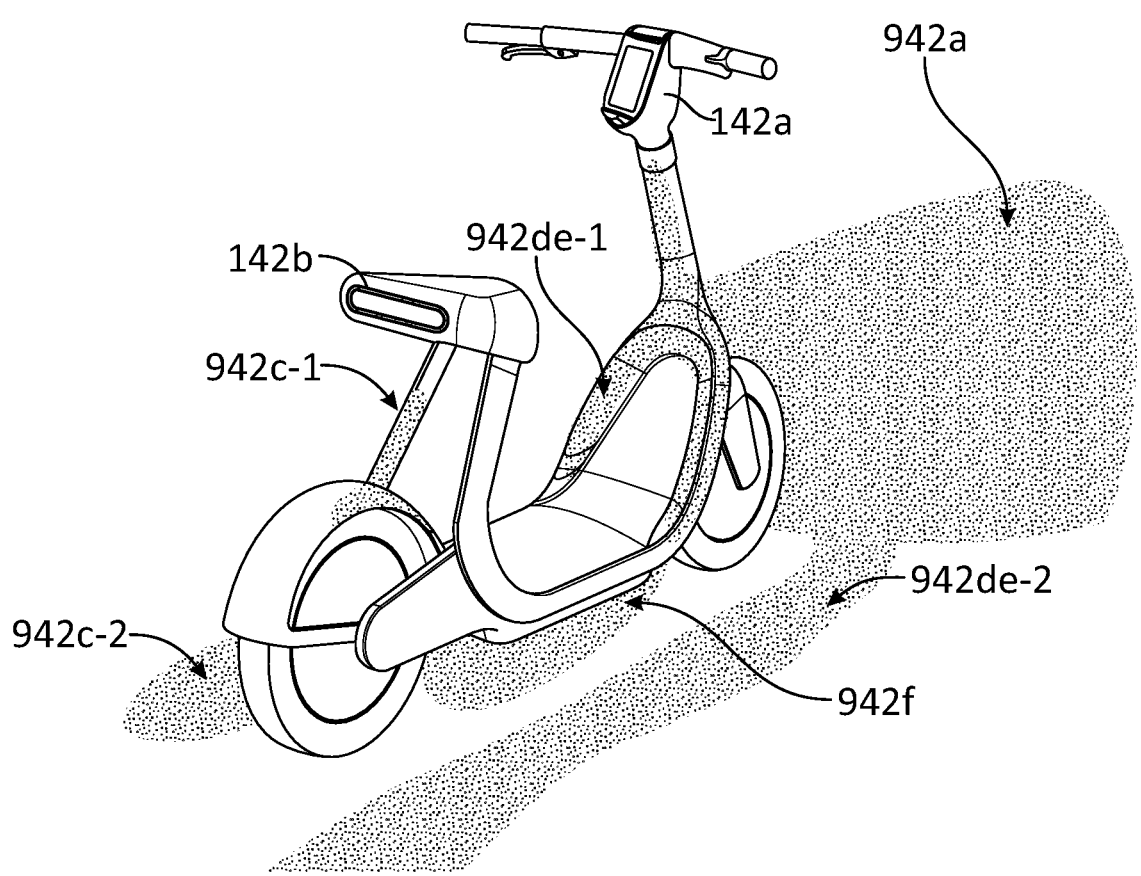
Figure 9C:
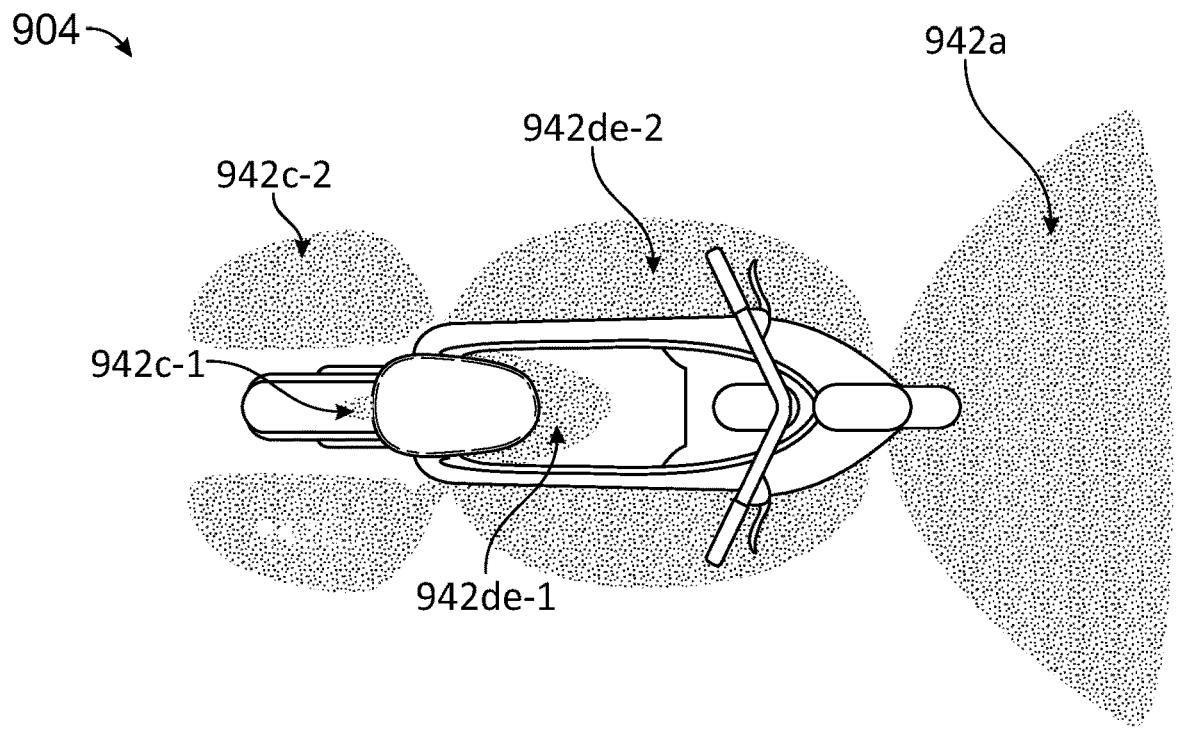

In addition to providing the various lighted beaconing mechanisms described herein, embodiments of vehicle lighting system 400 that include ambient lighting elements may be leveraged to provide enhanced rider and vehicle safety while fleet vehicle 110c is operated on a road, for example, or while parked. Such systems may be used to increase rider and vehicle visibility at night (e.g., to make others aware of the presence and operational status of the fleet vehicle and rider) and to increase rider perception of the environment (e.g., to ensure the rider is aware of any safety issues about the fleet vehicle), all of which can increase rider safety and hire frequency at night. FIGS. 9A-D illustrate various aspects of micro-mobility fleet vehicle lighting system 400 including one or more lighted vehicle beaconing systems (e.g., one or more of vehicle light assemblies 142a-h) and a variety of ambient light assemblies (e.g., ambient light assemblies 142c-f) to demonstrate various associated rider safety benefits, in accordance with embodiments of the disclosure. In particular, FIG. 9A illustrates ambient scene 900 about fleet vehicle 110c illuminated by headlight assembly 142a and taillight assembly 142b, where headlight assembly 142a provides forward facing illumination of road surface 942a in the expected path of fleet vehicle 110c, and where taillight assembly 142b provides road visibility for fleet vehicle 110c. By contrast, FIGS. 9B and 9C illustrate ambient scenes 902 and 904 about fleet vehicle 110c illuminated by headlight assembly 142a, taillight assembly 142b, and various ambient light assemblies, such as indirect running-light assembly 142c, foot-space light assembly 142d, storage light assembly 142e, and ground light assembly 142f of FIG. 4A.

Figure 9D:
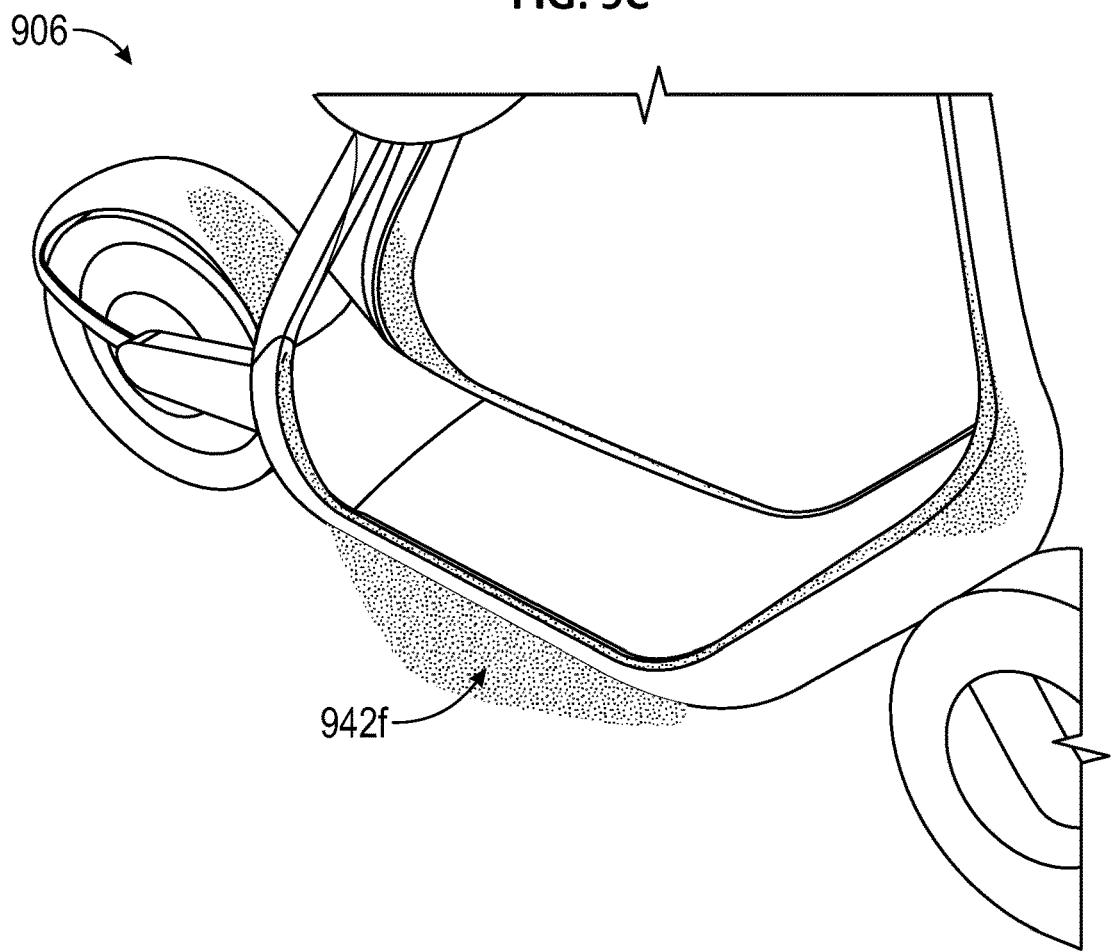

As shown in FIG. 9B, in addition to the illumination provided by headlight assembly 142a and taillight assembly 142b, indirect running-light assembly 142c may illuminate a rear portion 942c-1 of fleet vehicle 110c and a rear road surface 942c-2 about fleet vehicle 110c, foot-space light assembly 142d and/or storage light assembly 142e may illuminate a central portion 942de-1 of fleet vehicle 110c and a central road surface 942de-2 about fleet vehicle 110c, and ground light assembly 142f may illuminate an undercarriage portion 942f of fleet vehicle 110c (e.g., directly and/or via reflection from an underlying ground surface) and/or an associated road surface under fleet vehicle 110c. FIG. 9C illustrates ambient scene 904 about fleet vehicle 110c illuminated by headlight assembly 142a, taillight assembly 142b, and the various ambient light assemblies, from a top down view. As can be seen from FIGS. 9A-C, ambient lighting can significantly increase the visibility both of fleet vehicle 110c and of the environment about fleet vehicle 110c. Moreover, vehicle lighting systems including such ambient lighting assemblies may be configured to boost the effect of all multicolored and/or animated lighting sequences, including all lighted beaconing sequences described herein. In addition, FIG. 9D illustrates ambient scene 906 about fleet vehicle 110c illuminated primarily by ground light assembly 142f, where ground light assembly 142f is implemented with a light stencil or other illumination shaping mechanism to generate a shape, logo, or text illuminated under, within, or by undercarriage portion 942f of fleet vehicle 110c, which provides an opportunity to increase brand awareness, particularly at night, as described herein.

Figure 10A:
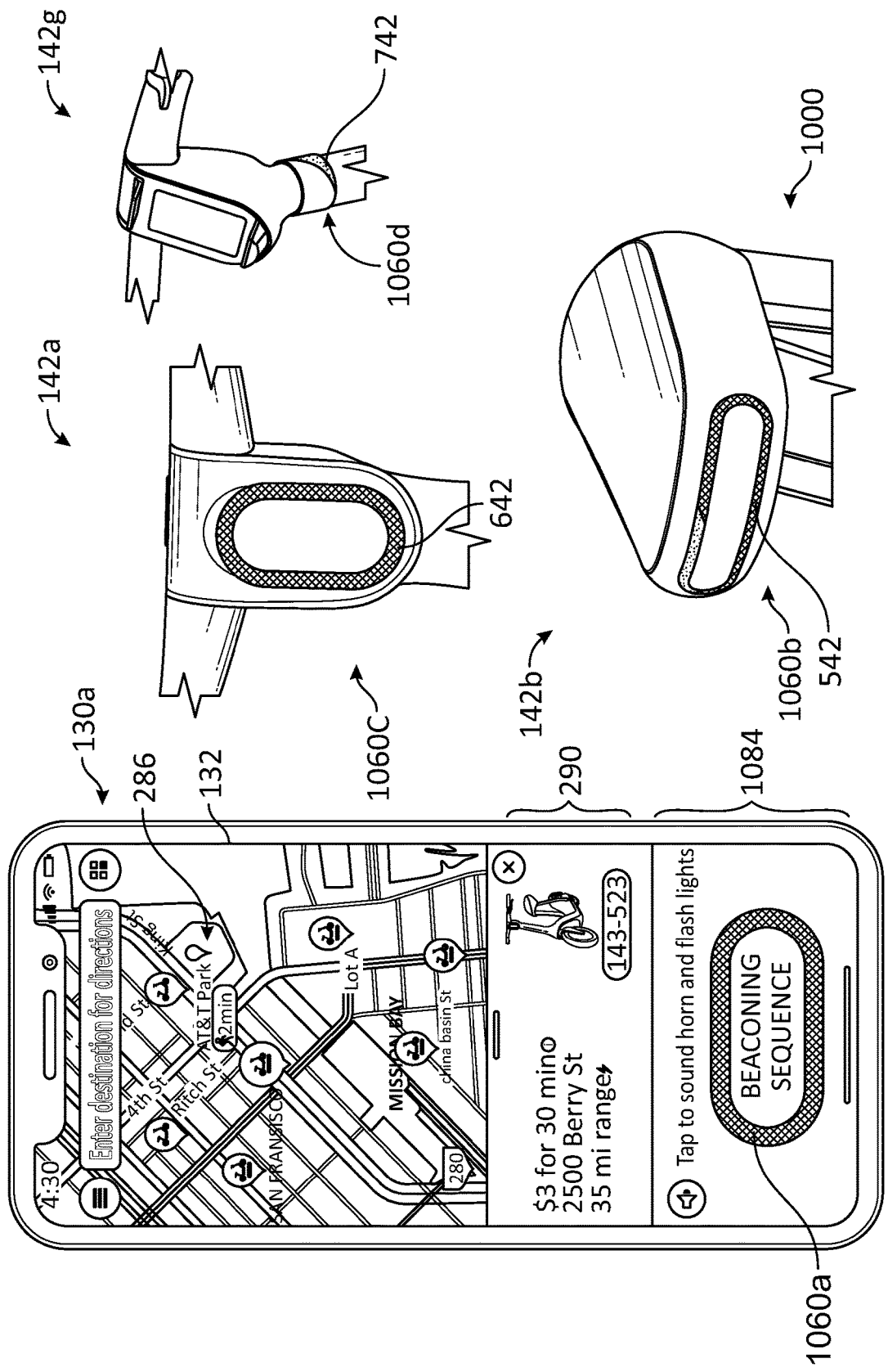
FIGS. 10A-B illustrate system diagrams of a dynamic transportation matching system incorporating micro-mobility fleet vehicles integrated with one or more lighted vehicle beaconing systems in accordance with an embodiment of the disclosure.
Figure 10B:
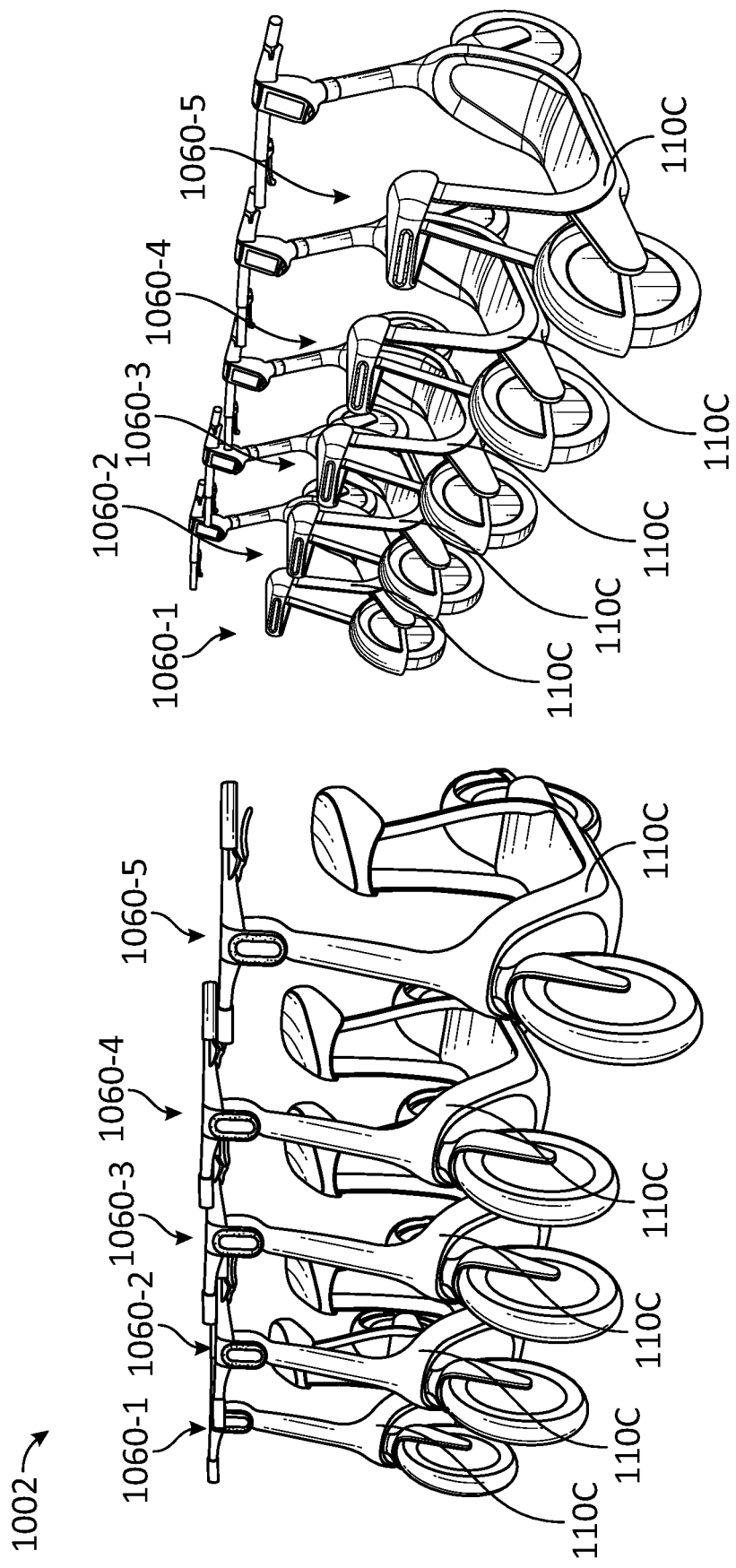

FIGS. 10A-B illustrate system diagrams of portions of dynamic transportation matching system 200 (e.g., dynamic transportation matching system 1000) that incorporates micro-mobility fleet vehicles (e.g., fleet vehicles 110b-d) integrated with one or more lighted vehicle beaconing systems (e.g., portions of vehicle lighting system 400) in accordance with an embodiment of the disclosure. For example, in FIG. 10A, dynamic transportation matching system 1000 includes user device 130a configured to render a beaconing sequence selector/indicator 1084, a route/street map 286, and/or a hire selector/indicator 290 on a display of user interface 132 to facilitate a user hiring or renting one of micro-mobility fleet vehicles 110b-d integrated with one or more lighted vehicle beaconing systems, such as headlight assembly 142a including programmable light element 642, taillight assembly 142b including programmable light element 542, and/or collar beacon light assembly 142g including programmable light element 742, as shown.

In the embodiment shown in FIG. 10A, hire selector/indicator 290 may be configured to indicate a variety of pre/post rental fleet vehicle status information, such as rental rate, pickup or drop off location, charge level, fleet vehicle type, fleet vehicle identification number, and/or other vehicle status information, as described herein, and to accept user selection of a particular fleet vehicle for rent. Street map 286 may be configured to indicate a present absolute position of user device 130a and/or fleet vehicle 110c, for example, and to display a route from user device 130a to fleet vehicle 110c (e.g., as determined by user device 130a and/or management system 240). Beaconing sequence selector/indicator 1084 may be configured to indicate a multicolor and/or animated lighting sequence 1060a for use in identifying a selected/rented fleet vehicle, for example, and to accept user selection to determine and/or issue a lighting control sequence corresponding to lighting sequence 1060a for transmission to the selected fleet vehicle. For example, beaconing sequence selector/indicator 1084 may be configured to receive user input defining a lighting control sequence corresponding to multicolor and/or animated lighting sequence 1060a.

Upon receipt of such lighting control sequence, one or more programmable light elements of lighted beaconing systems integrated with the selected fleet vehicle (e.g., one or more of programmable light element 642 of headlight assembly 142a, programmable light element 542 of taillight assembly 142b, and/or programmable light element 742 of collar beacon light assembly 142g) may be configured to generate a beaconing sequence (e.g., lighting sequences 1060b-d) mirroring and/or corresponding to multicolor and/or animated lighting sequence 1060a of beaconing sequence selector/indicator 1084. In some embodiments, once the selected fleet vehicle is generating its beaconing sequence corresponding to lighting sequence 1060a, user device 130a may be configured to identify the selected fleet vehicle within video (e.g., captured by camera 138) of a location including the selected fleet vehicle and a number of other fleet vehicles, for example, to help a requestor locate the selected fleet vehicle when eyesight alone is insufficient, for example, or when a lighting sequence generated by a programmable light element includes non-visible light components (e.g., that are detectable by camera 138).

In various embodiments, one or more of lighted sequences 1060a-d may be substantially synchronized in time, in animation rate, and/or in other sequence characteristics so as to facilitate user recognition of lighting sequence 1060a as reproduced by one or more of programmable light element 642, programmable light element 542, and/or programmable light element 742. In some embodiments, one or more ambient light assemblies including programmable light elements (e.g., LED cluster arrays, as opposed to strip arrays) may be configured to participate in such beaconing by generating a non-patterned lighting sequence that is color, time, and/or rate synchronized with lighting sequence 1060a and/or other programmable light elements of the selected fleet vehicle. In some embodiments, a beaconing sequence generated by a fleet vehicle may include an audible beaconing sequence (e.g., a pattern of sounds and/or notes, generated by a speaker—other modules 126—of the fleet vehicle) in addition to the lighted beaconing sequence corresponding to lighting sequence 1060a.

FIG. 10B illustrates dynamic transportation matching system 1002 (e.g., a portion of dynamic transportation matching system 200) including a group of fleet vehicles 110c each capable of generating its own beaconing sequence (e.g., headlight assembly beaconing sequences 1060-1-5 and taillight assembly beaconing sequences 1062-1-5) based on a corresponding fleet vehicle status, for example, and/or in response to receiving a group lighting control sequence, as described herein. In one embodiment, each fleet vehicle may be configured to generate a fleet vehicle status lighting sequence while waiting to be rented. Such fleet vehicle status lighting sequence may include one or more of an availability status lighting sequence (e.g., a first predetermined color/pattern for available, a second predetermined color/pattern for unavailable), a charge status lighting sequence (e.g., a set of colors and/or patterns indicating approximate ranges of charge levels, such as less than or equal to 25% full charge, from 25% to 50%, from 50% to 75%, and 75% or above), a service status lighting sequence (e.g., a relatively slow "breathing" animation using a critical color, such as orange, when service is required), and/or other vehicle status lighting sequences configured to convey a characteristic and/or status of a fleet vehicle, as described herein. In related embodiments, the fleet vehicle may be configured to cycle through one or more such fleet vehicle status lighting sequences, and such cycling and/or beaconing may be slowed or simplified or omitted depending on the available battery charge level. In some embodiments, a fleet servicer may issue a group lighting control sequence to perform a group status check, where each fleet vehicle in dynamic transportation matching system 1002 (and/or within line of sight of a user device 130 of a fleet servicer) is forced to generate one or more such vehicle status lighting sequence substantially in unison, so as to facilitate quick group assessment of the fleet status.

In other embodiments, dynamic transportation matching system 1002 may be configured to detect the relative positions and/or orientations of a group of fleet vehicles parked together (e.g., reported as fleet vehicle status information), as shown in FIG. 10B, and issue group lighting control sequences to generate multicolor and/or animated group lighting sequences, so as to function as an aggregate display (e.g., a group of programmable light elements) configured to generate group animations designed for an array of aligned programmable light elements, for example. In one embodiment, such group lighting sequence may include an individual lighting sequence generated by all fleet vehicles in the group in unison, for example, or staggered in time to extend the animation beyond the extent of a single programmable light element (e.g., a staggered "sweep right" group animation generated by headlight assembly beaconing sequences 1060-1-5 and/or taillight assembly beaconing sequences 1062-1-5 that sweeps right across all of fleet vehicles 110c in FIG. 10B). In another embodiment, such group lighting sequence may include a distributed set of differentiated lighting sequences generated by each fleet vehicle in the group in a time synchronized manner (e.g., a "tennis" group animation generated by taillight assembly beaconing sequences 1062-1-5 that bats an animated ball graphic between the left most and the right most fleet vehicle in the array of fleet vehicles 110 in FIG. 10B).

Figure 11A:
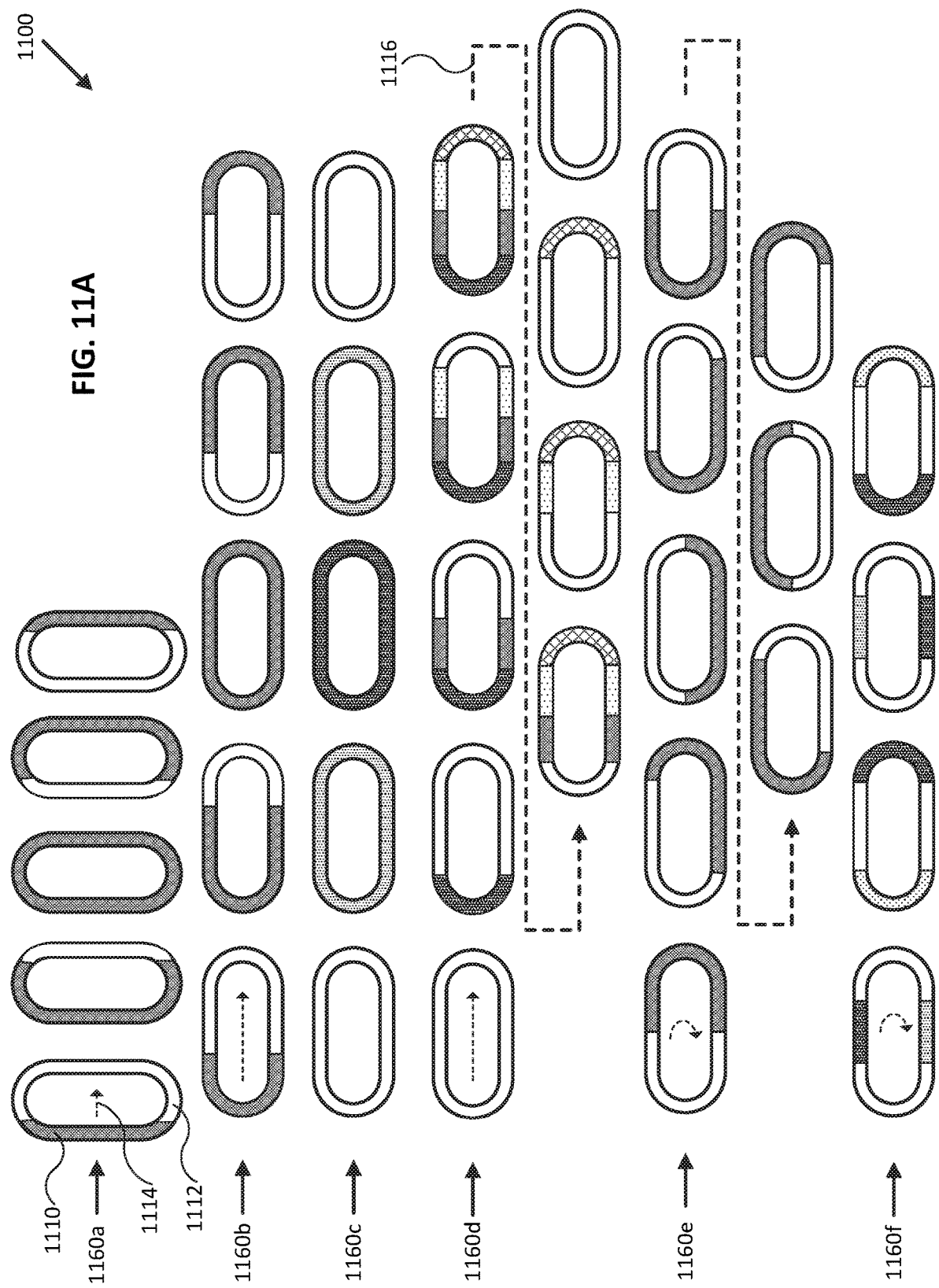
FIGS. 11A-B illustrates a variety of beacon animations for lighted vehicle beaconing systems in accordance with embodiments of the disclosure.
Figure 11B:
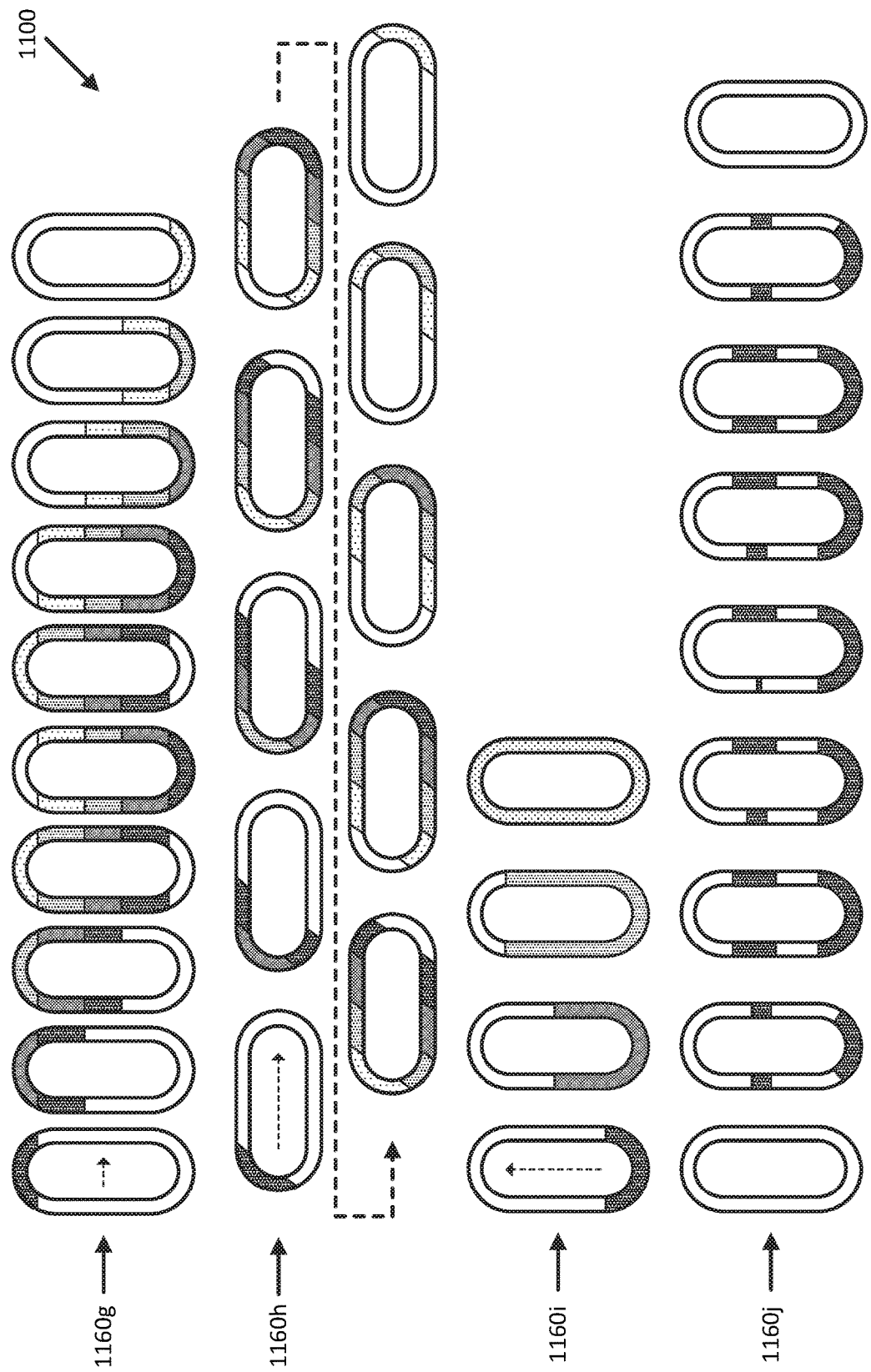

FIGS. 11A-B illustrates a variety of beaconing or lighting sequence animations for lighted vehicle beaconing systems in accordance with embodiments of the disclosure. In FIGS. 11A-B, each lighting sequence animation 1160a-j includes a series of vertically or horizontally aligned stadium or obround shaped diagrams corresponding to a particular lighting sequence state for a programmable strip light array (e.g., a mapping of a particular lighting sequence element/frame to the strip light array) used to implement various programmable light elements described herein, such as those used to implement embodiments of headlight assemblies 142a and 142h and/or taillight assembly 142b. Within each obround shaped diagram, filled areas (e.g., area 1110 of lighting sequence animation 1160a) represent energized color fields (e.g., with a specified shape and a common selected color and/or intensity), and non-filled areas (e.g., area 1112 of lighting sequence animation 1160a) represent either deenergized fields (e.g., no energized colors within the specified shape) or energized color fields with a color and/or intensity different from that of the adjacent filled area(s). Filled areas with different fill patterns within the same obround shaped diagram represent energized color fields with differentiated colors and/or intensities from that of the adjacent filled area(s).

In some embodiments, filled and/or non-filled areas within a particular lighting sequence animation 1160a-j represent a consistent color and/or intensity choice throughout at least one pass through the particular lighting sequence animation 1160a j. In other embodiments, the color and/or intensity choice for each filled and/or non-filled area may vary between each obround shaped diagram within a particular lighting sequence animation 1160a-j (e.g., only the shape of the filled/non-filled areas and the adjacent-area color/intensity differentiation is defined for each lighting sequence animation 1160a-j). Dashed line animation guides (e.g., animation guide 1114 of lighting sequence animation 1160a) are provided to illustrate inferred motion of the color fields (e.g., left to right, clockwise) and do not form part of the lighting sequence animations or the associated programmable light elements. Dashed animation continuation guides (e.g., continuation guide 1116 of lighting sequence animation 1160d) are provided to illustrate adjacent elements/frames of an animation that cannot fit within a single horizontal series within the associated sheet.

In general, each lighting sequence animation 1160*a-j* may be generated by any similarly shaped programmable light element, regardless of the orientation presented in FIGS. 11A-B. Moreover, each lighting sequence animation 1160*a-j* may be performed "forward" from left to right (e.g., as viewed in the sheet frame) or "backward" from right to left, and clockwise or counterclockwise (e.g., as illustrated by an associated animation guide). Furthermore, although presented as separate lighting sequence animations 1160*a* j, lighting sequence animations 1160*a-j* and/or elements/ frames of lighting sequence animations 1160*a-j* may be combined to form other lighting sequence animations including any selection, subset, or ordering of elements/ frames of lighting sequence animations 1160*a-j*.

As shown in FIG. 11A, "sweep right" lighting sequence animation 1160*a* may include five lighting sequence elements/frames where a vertically aligned color field invades the entirety of a vertically aligned obround shaped programmable light element from the left and then at least partially expires to the right. In various embodiments, lighting sequence animation 1160*a* may be performed in reverse to generate a "sweep left" lighting sequence animation, for example, or performed and performed again in reverse to generate a "pendulum" lighting sequence animation. "Sweep right" lighting sequence animation 1160*b* may include five lighting sequence elements/frames where a vertically aligned color field invades the entirety of a horizontally aligned obround shaped programmable light element from the left and then expires to the right. In various embodiments, lighting sequence animation 1160*b* may be performed in reverse to generate a "sweep left" lighting sequence animation, for example, or performed and performed again in reverse to generate a "pendulum" lighting sequence animation. "Breath" lighting sequence animation 1160*c* may include five lighting sequence elements/frames where the entirety of a horizontally aligned obround shaped programmable light element is energized from a first color and/or a zero intensity to a different color and/or a relatively high intensity and then deenergized back to the first color and/or zero intensity. In various embodiments, lighting sequence animation 1160*c* may be performed multiple times to generate a "breathing" lighting sequence animation.

"Rainbow sweep right" lighting sequence animation 1160*d* may include nine lighting sequence elements/frames where a series of vertically aligned and differentiated color fields invade the entirety of a horizontally aligned obround shaped programmable light element from the left and then expire to the right. In various embodiments, lighting sequence animation 1160*d* may be performed in reverse to generate a "rainbow sweep left" lighting sequence animation, for example, or performed and performed again in reverse to generate a "rainbow pendulum" lighting sequence animation. "Tail chase" lighting sequence animation 1160*e* may include eight lighting sequence elements/frames where two differentiated color fields (e.g., or one color field and one non-energized field) split and cycle clockwise through a horizontally aligned obround shaped programmable light element. "Gapped tail chase" lighting sequence animation 1160*f* may include four lighting sequence elements/frames where two differentiated color fields gapped by two color fields with the same characteristics (e.g., or two non-energized fields) cycle clockwise through a horizontally aligned obround shaped programmable light element.

As shown in FIG. 11B, "rainbow sweep down" lighting sequence animation 1160*g* may include ten lighting sequence elements/frames where a series of vertically aligned and differentiated color fields invade the entirety of a vertically aligned obround shaped programmable light element from the top, oscillate vertically (e.g., once—as shown—or multiple times), and then expire to the bottom. In various embodiments, lighting sequence animation 1160*g* may be performed in reverse to generate a "rainbow sweep up" lighting sequence animation, for example, or performed and performed again in reverse to generate a "vertical rainbow pendulum" lighting sequence animation. "Slant rainbow sweep right" lighting sequence animation 1160*h* may include ten lighting sequence elements/frames (e.g., synchronous with the 10 lighting sequence elements/frames of "rainbow sweep down" lighting sequence animation 1160*g*) where a series of slant-aligned and differentiated color fields invade the entirety of a horizontally aligned obround shaped programmable light element from the left and then expire to the right. In various embodiments, lighting sequence animation 1160*h* may be performed in reverse to generate a "slant rainbow sweep left" lighting sequence animation, for example, or performed and performed again in reverse to generate a "slant rainbow pendulum" lighting sequence animation. In various embodiments, lighting sequence animation 1160*g* may be generated by headlight assembly 142*a* and lighting sequence animation 1160*h* may be generated by taillight assembly 142*b* in synchronous fashion to provide an enhanced beaconing animation using multiple synchronized vehicle light assemblies, as described herein.

Charge status lighting sequence animation 1160*i* may include four lighting sequence elements/frames where a series of horizontally aligned and differentiated color fields invade the entirety of a vertically aligned obround shaped programmable light element from the bottom. In various embodiments, lighting sequence animation 1160*i* may be configured to indicate a charge status of fleet vehicle 110*c*. "Wink" lighting sequence animation 1160*j* may include nine lighting sequence elements/frames where a series of color fields are animated within a vertically aligned obround shaped programmable light element to expand a simplified smiling face, wink one eye of the simplified smiling face, and then deflate the simplified smiling face. In various embodiments, elements/frames 3-7 of lighting sequence animation 1160*j* may be performed multiple times, with variable pauses between cycles, to convey information embedded within the wink rate of lighting sequence animation 1160*j*, including to generate a particular beaconing animation associated with and/or identifying a particular requestor and/or a particular fleet vehicle 110*c*.

FIG. 12 illustrates a flow diagram of a process 1200 to provide lighted vehicle beaconing in accordance with an embodiment of the disclosure. It should be appreciated that any step, sub-step, sub-process, or block of process 1200 may be performed in an order or arrangement different from the embodiments illustrated by FIG. 12. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1200 is described with reference to systems, processes, control loops, and images described in reference to FIGS. 1-11B, process 1200 may be performed by other systems different from those systems, processes, control loops, and images and including a different selection of electronic devices, sensors, assemblies, mobile structures, and/or mobile structure attributes, for example.

In block 1202, a request to rent a fleet vehicle is received. For example, management system 240 and/or controller 112 may be configured to receive a request to rent micro-mobility fleet vehicle 110c from user device 130a. In various embodiments, such request may identify a particular type of micro-mobility fleet vehicle, a particular vehicle status (e.g., charge state and/or pick up location), and/or a specific micro-mobility fleet vehicle. In some embodiments, such request may include a location of user device 130a and/or other characteristics of a requestor associated with user device 130a. For example, such requestor characteristics may include a preference for a particular beaconing animation or set of beaconing animations, for example, or may include a user defined lighting control sequence, as described herein.

In block 1204, a lighting control sequence is determined. For example, management system 240 and/or controller 112 may be configured to determine a lighting control sequence associated with the request to rent micro-mobility fleet vehicle 110c received in block 1202 and/or associated with micro-mobility fleet vehicle 110c identified in the request. In one embodiment, such lighting control sequence may include a beaconing control sequence, for example, and management system 240 may be configured to determine a beaconing control sequence that is spatially and/or temporally unique with respect to an environment about micro-mobility fleet vehicle 110c (e.g., within line of sight of a location of micro-mobility fleet vehicle 110c) so as to provide a differentiated and recognizable corresponding beaconing sequence as a requestor attempts to locate micro-mobility fleet vehicle 110c. In another embodiment, management system 240 may be configured to determine the beaconing control sequence based, at least in part, on a user preference for a particular beaconing animation and/or set of beaconing animations, for example, or to determine the beaconing control sequence based on a user defined lighting control sequence provided to user device 130a, as described herein.

In further embodiments, such lighting control sequence may include a vehicle status lighting control sequence, for example, or a group lighting control sequence, and management system 240 and/or controller 112 may be configured to determine such lighting control sequence based, at least in part, on a vehicle status associated with micro-mobility fleet vehicle 110c, for example, such as an availability status, a charge status, a service status, relative positions and/or orientations of a local group of micro-mobility fleet vehicles, and/or other vehicle status information. For example, controller 112 may be configured to detect one or more such vehicle statuses, determine a vehicle status lighting sequence corresponding to the detected vehicle status, and generate the lighting control sequence based, at least in part, on the determined vehicle status lighting sequence corresponding to the detected vehicle status, as described herein. In still further embodiments, controller 112 may be configured to determine such lighting control sequence based on user input provided to micro-mobility fleet vehicle 110c directly (e.g., turn signal, braking, ambient lighting, and/or other operator requests provided to user interface 113 of the micro-mobility fleet vehicle) or indirectly (e.g., via user device 130a). Controller 112 may also be configured to determine such lighting control sequence by receiving the lighting control sequence over a wireless communication link established by wireless communications module 120, where the lighting control sequence is generated by management system 240 and/or user device 130a (e.g., associated with a requestor for micro-mobility fleet vehicle 110c).

In embodiments where management system 240 is configured to determine or help determine the lighting control sequence (e.g., where the lighting control sequence includes a beaconing control sequence), management system 240 may be configured to distribute the lighting control sequence among user device 130a and micro-mobility fleet vehicle 110c. In one embodiment, management system 240 may be configured to provide the lighting control sequence to user device 130a first so that user device 130 is able to generate lighting sequence 1060a of beaconing sequence selector/indicator 1084 and display it to a requestor prior to initiating beaconing at micro-mobility fleet vehicle 110c. User device 130a may be configured to receive user selection of beaconing sequence selector/indicator 1084 (e.g., to select, adjust, and/or initiate beaconing associated with lighting sequence 1060a) and to provide a corresponding selected, adjusted, or initiated lighting control sequence to management system 240, which may be configured to relay such lighting control sequence to micro-mobility fleet vehicle 110c (e.g., to controller 112 of micro-mobility fleet vehicle 110c).

In other embodiments, management system 240 may be configured to provide the lighting control sequence to user device 130a and micro-mobility fleet vehicle 110c substantially simultaneously, for example, or to micro-mobility fleet vehicle 110c first in order to receive a receipt confirmation before providing the lighting control sequence to user device 130a. In alternative embodiments, user device 130a may be configured to provide a selected, adjusted, or initiated lighting control sequence directly to controller 112 of micro-mobility fleet vehicle 110c via a direct wireless communication link established between wireless communications module 120 of micro-mobility fleet vehicle 110c and wireless communications module 134 of user device 130a.

In block 1206, a lighting sequence is generated. For example, controller 112 may be configured to generate a multicolored and/or animated lighting sequence corresponding to the lighting control sequence determined in block 1204 by providing the lighting control sequence to a programmable light element of a vehicle light assembly coupled to and/or integrated with micro-mobility fleet vehicle 110c. In various embodiments, programmable light elements of ambient light assemblies 142c-f may be configured to receive ambient lighting control sequences generated specifically for such programmable light elements (e.g., spotlights implemented by programmable LED clusters) and to generate a multicolored and/or animated ambient lighting sequence based, at least in part, on the received ambient lighting control sequence. In some embodiments, programmable light elements of ambient light assemblies 142c-f may be configured to receive beaconing control sequences generated for other types of programmable light elements, such as obround shaped programmable strip light arrays, and generate multicolored and/or animated ambient lighting sequences based, at least in part, on the received beaconing control sequences. For example, ambient light assemblies 142c-f may be configured to map a spatial and temporal distribution of colors and intensities of color fields identified in a received beaconing control sequence to a temporal distribution of colors and intensities in an corresponding ambient lighting control sequence, which is then used to generate an ambient lighting sequence that is at least partially temporally and/or chromatically synchronous with a corresponding lighted beaconing sequence, as described herein.

Embodiments of the present disclosure can thus provide a reliable and robust methodology to assist requestors in locating requested and/or rented micro-mobility fleet vehicles and to increase overall safety associated with operation of micro-mobility fleet vehicles provided for hire by a transportation services provider employing a dynamic transportation matching system to link fleet vehicles to requestors/riders of micro-mobility fleet vehicles, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micro-mobility fleet vehicle beaconing system comprising:
    a vehicle light assembly configured to be coupled to a micro-mobility fleet vehicle, wherein the vehicle light assembly comprises a programmable light element configured to receive a lighting control sequence corresponding to a dynamic transportation matching system vehicle status comprising one or more of an availability status, a charge status, and/or a service status of the micro-mobility fleet vehicle and generate a multicolored and/or animated lighting sequence corresponding to the received lighting control sequence; and
    a logic device configured to communicate with the programmable light element, wherein the logic device is configured to:
    determine the lighting control sequence; and
    provide the lighting control sequence to the programmable light element of the vehicle light assembly to cause the vehicle light assembly to generate the multicolored and/or animated lighting sequence.

2. The micro-mobility fleet vehicle beaconing system of claim 1,
    further comprising a wireless communications module configured to be integrated with the micro-mobility fleet vehicle, wherein:
    the determining the lighting control sequence comprises receiving the lighting control sequence over a wireless communication link established by the wireless communications module; and
    the lighting control sequence comprises a beaconing control sequence generated by a fleet management system and/or a user device associated with a requester for the micro-mobility fleet vehicle.

3. The micro-mobility fleet vehicle beaconing system of claim 2, wherein:
    the beaconing control sequence corresponds to a beaconing animation or a group animation comprising one or more of a sweep right, sweep left, or pendulum lighting sequence animation, a breath or breathing lighting sequence animation, a rainbow sweep right, rainbow sweep left, or rainbow pendulum lighting sequence animation, a tail chase or gapped tail chase lighting sequence animation, a rainbow sweep down, rainbow sweep up, or vertical rainbow pendulum lighting sequence animation, a slant rainbow sweep right, slant rainbow sweep left, or slant rainbow pendulum lighting sequence animation, a wink lighting sequence animation, a staggered sweep or pendulum animation, and/or a tennis animation.

4. The micro-mobility fleet vehicle beaconing system of claim 1, wherein the determining the lighting control sequence comprises:
    detecting the dynamic transportation matching system vehicle status;
    determining a dynamic transportation matching system vehicle status lighting sequence corresponding to the detected dynamic transportation matching system vehicle status, wherein the dynamic transportation matching system vehicle status lighting sequence comprises one or more of availability status lighting sequence, a charge status lighting sequence, and/or a service status lighting sequence; and
    generating the lighting control sequence based, at least in part, on the determined dynamic transportation matching system vehicle status lighting sequence corresponding to the detected dynamic transportation matching system vehicle status.

5. The micro-mobility fleet vehicle beaconing system of claim 1, wherein:
    the vehicle light assembly comprises a micro-mobility fleet vehicle taillight assembly; and
    the programmable light element comprises a horizontally aligned obround shaped programmable strip light array configured to generate the multicolored and/or animated lighting sequence.

6. The micro-mobility fleet vehicle beaconing system of claim 1, wherein:
    the vehicle light assembly comprises a micro-mobility fleet vehicle headlight assembly; and
    the programmable light element comprises a vertically aligned obround shaped programmable strip light array configured to generate the multicolored and/or animated lighting sequence.

7. The micro-mobility fleet vehicle beaconing system of claim 6, wherein:
    the micro-mobility fleet vehicle headlight assembly comprises a headlamp assembly configured to generate a variable forward illumination of a path of the micro-mobility fleet vehicle and/or a camera configured to detect an ambient light level about the micro-mobility fleet vehicle; and
    the micro-mobility fleet vehicle headlight assembly is integrated with a cockpit assembly for the micro-mobility fleet vehicle.

8. The micro-mobility fleet vehicle beaconing system of claim 6, wherein:

the vertically aligned obround shaped programmable strip light array is configured to generate a variable forward illumination of a path of the micro-mobility fleet vehicle.

9. A micro-mobility fleet vehicle comprising the micro-mobility fleet vehicle beaconing system of claim 1, wherein the vehicle light assembly is integrated with the micro-mobility fleet vehicle, the micro-mobility fleet vehicle further comprising one or more ambient light assemblies coupled to and/or integrated with the micro-mobility fleet vehicle, wherein:
the multicolored and/or animated lighting sequence comprises a beaconing sequence;
each ambient light assembly comprises a spotlight comprising a programmable LED cluster configured to receive an ambient lighting control sequence and generate a multicolored and/or animated ambient lighting sequence based, at least in part, on the received ambient lighting control sequence; and
the logic device is configured to provide the ambient lighting control sequence to each programmable LED cluster of the one or more ambient light assemblies to cause the one or more ambient light assemblies to generate the multicolored and/or animated ambient lighting sequence.

10. A dynamic transportation matching system comprising the micro-mobility fleet vehicle beaconing system of claim 1, further comprising a management system and the micro-mobility fleet vehicle, wherein the management system is configured to:
receive a request to rent the micro-mobility fleet vehicle from a user device;
determine a beaconing control sequence associated with the request and the micro-mobility fleet vehicle; and
provide the beaconing control sequence to the user device and/or to the micro-mobility fleet vehicle.

11. A method comprising:
determining a lighting control sequence for a vehicle light assembly coupled to a micro-mobility fleet vehicle, wherein:
the vehicle light assembly comprises a programmable light element configured to receive a lighting control sequence and generate a multicolored and/or animated lighting sequence corresponding to the received lighting control sequence; and
the lighting control sequence corresponds to a dynamic transportation matching system vehicle status comprising one or more of an availability status, a charge status, and/or a service status of the micro-mobility fleet vehicle; and
providing the lighting control sequence to the programmable light element of the vehicle light assembly to cause the vehicle light assembly to generate the multicolored and/or animated lighting sequence.

12. The method of claim 11, wherein:
the determining the lighting control sequence comprises receiving the lighting control sequence over a wireless communication link established by a wireless communications module; and
the lighting control sequence comprises a beaconing control sequence generated by a fleet management system and/or a user device associated with a requester for the micro-mobility fleet vehicle.

13. The method of claim 12, wherein:
the beaconing control sequence corresponds to a beaconing animation or a group animation comprising one or more of a sweep right, sweep left, or pendulum lighting sequence animation, a breath or breathing lighting sequence animation, a rainbow sweep right, rainbow sweep left, or rainbow pendulum lighting sequence animation, a tail chase or gapped tail chase lighting sequence animation, a rainbow sweep down, rainbow sweep up, or vertical rainbow pendulum lighting sequence animation, a slant rainbow sweep right, slant rainbow sweep left, or slant rainbow pendulum lighting sequence animation, a wink lighting sequence animation, a staggered sweep or pendulum animation, and/or a tennis animation.

14. The method of claim 11, wherein the determining the lighting control sequence comprises:
detecting the dynamic transportation matching system vehicle status;
determining a dynamic transportation matching system vehicle status lighting sequence corresponding to the detected dynamic transportation matching system vehicle status, wherein the dynamic transportation matching system vehicle status lighting sequence comprises one or more of availability status lighting sequence, a charge status lighting sequence, and/or a service status lighting sequence; and
generating the lighting control sequence based, at least in part, on the determined dynamic transportation matching system vehicle status lighting sequence corresponding to the detected dynamic transportation matching system vehicle status.

15. The method of claim 11, wherein:
the vehicle light assembly comprises a micro-mobility fleet vehicle taillight assembly; and
the programmable light element comprises a horizontally aligned obround shaped programmable strip light array configured to generate the multicolored and/or animated lighting sequence.

16. The method of claim 11, wherein:
the vehicle light assembly comprises a micro-mobility fleet vehicle headlight assembly; and
the programmable light element comprises a vertically aligned obround shaped programmable strip light array configured to generate the multicolored and/or animated lighting sequence.

17. The method of claim 16, wherein:
the micro-mobility fleet vehicle headlight assembly comprises a headlamp assembly configured to generate a variable forward illumination of a path of the micro-mobility fleet vehicle and/or a camera configured to detect an ambient light level about the micro-mobility fleet vehicle; and
the micro-mobility fleet vehicle headlight assembly is integrated with a cockpit assembly for the micro-mobility fleet vehicle.

18. The method of claim 16, wherein:
the vertically aligned obround shaped programmable strip light array is configured to generate a variable forward illumination of a path of the micro-mobility fleet vehicle.

19. The method of claim 11, wherein the multicolored and/or animated lighting sequence comprises a beaconing sequence, the method further comprising:
providing an ambient lighting control sequence to a programmable LED cluster of an ambient light assembly coupled to and/or integrated with the micro-mobility fleet vehicle to cause the ambient light assembly to generate a multicolored and/or animated ambient lighting sequence, wherein the programmable LED cluster is configured to receive the ambient lighting control sequence and generate the multicolored and/or animated ambient lighting sequence based, at least in part, on the received ambient lighting control sequence.

20. The method of claim 11, further comprising:

receiving a request to rent a micro-mobility fleet vehicle from a user device;

determining a beaconing control sequence associated with the request and the micro-mobility fleet vehicle; and providing the beaconing control sequence to the user device and/or to the micro-mobility fleet vehicle, wherein the determining the lighting control sequence comprises receiving the lighting control sequence as the provided beaconing control sequence.

* * * * *